(12) United States Patent
Huynh

(10) Patent No.: US 12,083,825 B2
(45) Date of Patent: Sep. 10, 2024

(54) VEHICLE WHEEL WITH HIDDEN COLORED SURFACES

(71) Applicant: Chi Huynh, San Dimas, CA (US)

(72) Inventor: Chi Huynh, San Dimas, CA (US)

( * ) Notice: Subject to any disclaimer, the term of this patent is extended or adjusted under 35 U.S.C. 154(b) by 534 days.

(21) Appl. No.: 17/163,020

(22) Filed: Jan. 29, 2021

(65) Prior Publication Data

US 2022/0242163 A1    Aug. 4, 2022

(51) Int. Cl.
| | |
|---|---|
| *B60B 7/00* | (2006.01) |
| *B60B 3/10* | (2006.01) |
| *B60B 3/14* | (2006.01) |
| *B60B 7/18* | (2006.01) |
| *B60Q 1/32* | (2006.01) |

(52) U.S. Cl.
CPC ............... *B60B 7/006* (2013.01); *B60B 3/10* (2013.01); *B60B 7/18* (2013.01); *B60Q 1/326* (2013.01); *B60B 3/14* (2013.01); *B60B 2900/572* (2013.01)

(58) Field of Classification Search
CPC .. B60B 3/002; B60B 3/02; B60B 3/10; B60B 3/14; B60B 7/006; B60B 7/18; B60B 2900/572; B60Q 1/326
See application file for complete search history.

(56) References Cited

U.S. PATENT DOCUMENTS

| | | | | |
|---|---|---|---|---|
| 2,027,478 A | * | 1/1936 | Hamer | B60Q 1/326 |
| | | | | 362/500 |
| 3,178,231 A | * | 4/1965 | Hezler, Jr. | B60B 7/18 |
| | | | | 301/37.29 |
| 6,220,733 B1 | * | 4/2001 | Gordon | B60Q 1/326 |
| | | | | 362/500 |
| 2004/0130905 A1 | * | 7/2004 | Olds | B60Q 1/326 |
| | | | | 362/500 |
| 2005/0030755 A1 | * | 2/2005 | Thomas | B60Q 1/326 |
| | | | | 362/500 |
| 2005/0099820 A1 | * | 5/2005 | Cooper | B60Q 1/326 |
| | | | | 362/500 |
| 2005/0225160 A1 | * | 10/2005 | Barnes | B60B 7/006 |
| | | | | 301/37.101 |
| 2006/0082213 A1 | * | 4/2006 | Tirado | B60B 7/01 |
| | | | | 301/37.109 |
| 2008/0111419 A1 | * | 5/2008 | Stahel | B60B 7/006 |
| | | | | 301/37.41 |
| 2016/0311251 A1 | * | 10/2016 | Hodges | B60B 7/14 |
| 2017/0341568 A1 | * | 11/2017 | Englert | B60Q 1/326 |

FOREIGN PATENT DOCUMENTS

| | | | | |
|---|---|---|---|---|
| GB | 2580288 A | * | 7/2020 | ............. B60B 7/066 |
| WO | WO-2006051114 A1 | * | 5/2006 | ............. B60Q 1/326 |

OTHER PUBLICATIONS

Machine Translation of WO 2006051114 A1, 7 pages (Year: 2006).*

* cited by examiner

*Primary Examiner* — S. Joseph Morano
*Assistant Examiner* — Emily G. Castonguay
(74) *Attorney, Agent, or Firm* — Wagenknecht IP Law Group PC

(57) ABSTRACT

A wheel for a vehicle, which includes a mount configured to mount the wheel to a hub of the vehicle; a colored surface that is hidden from direct view from an outside environment when the wheel is mounted to the hub; and a contoured reflective surface optically aligned to reflect the colored surface into view of the outside environment when the wheel is mounted, thereby appearing to alter a color of the reflective surface.

11 Claims, 23 Drawing Sheets

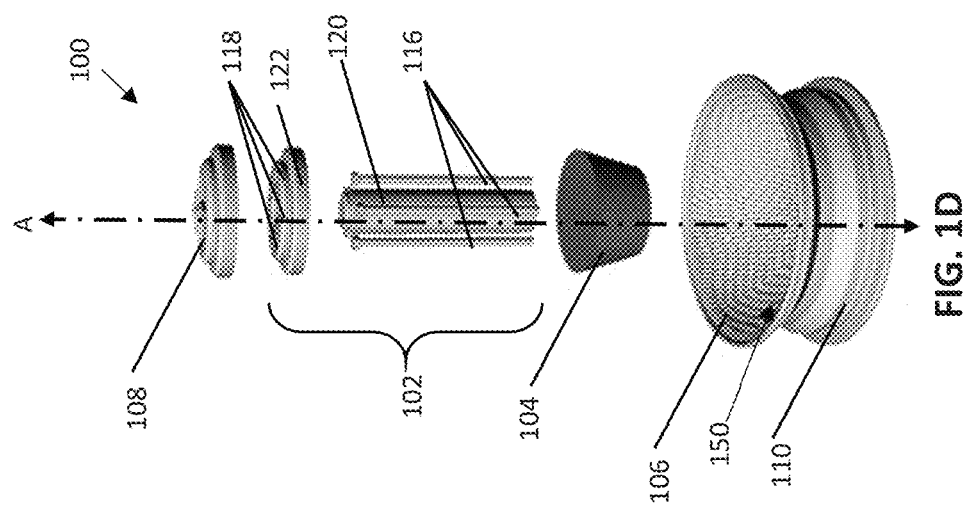
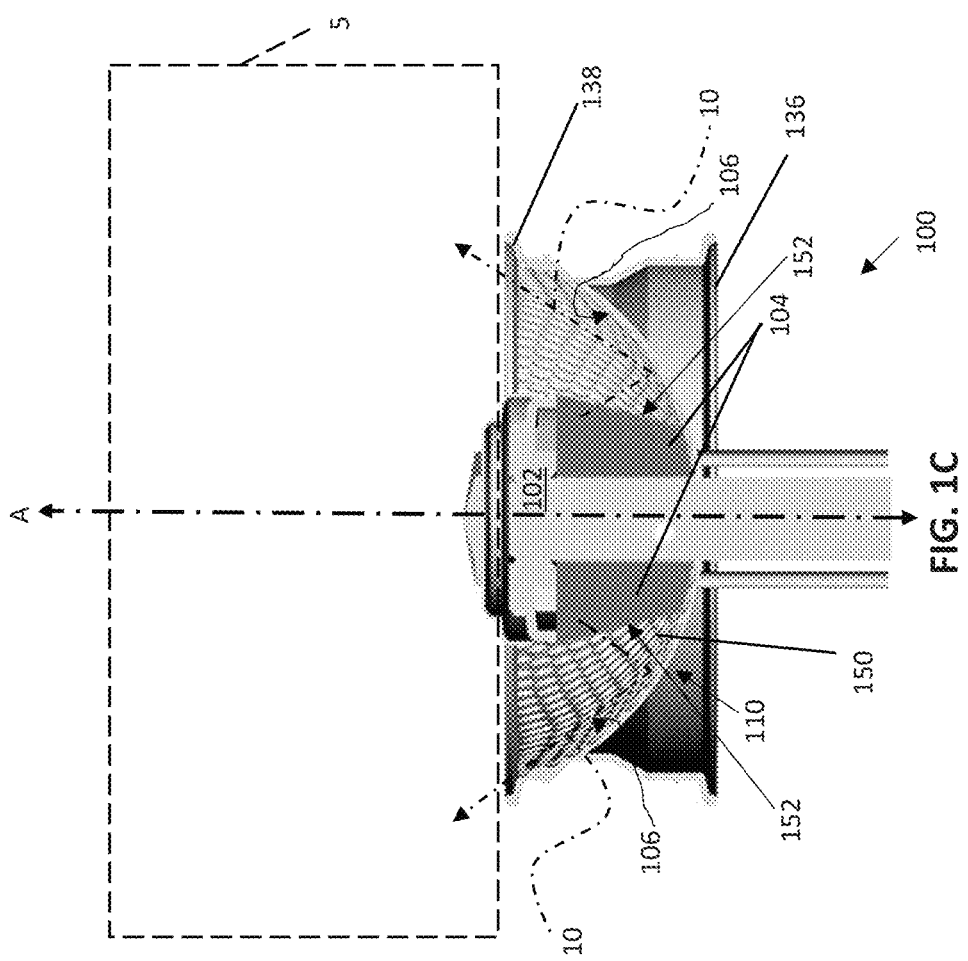

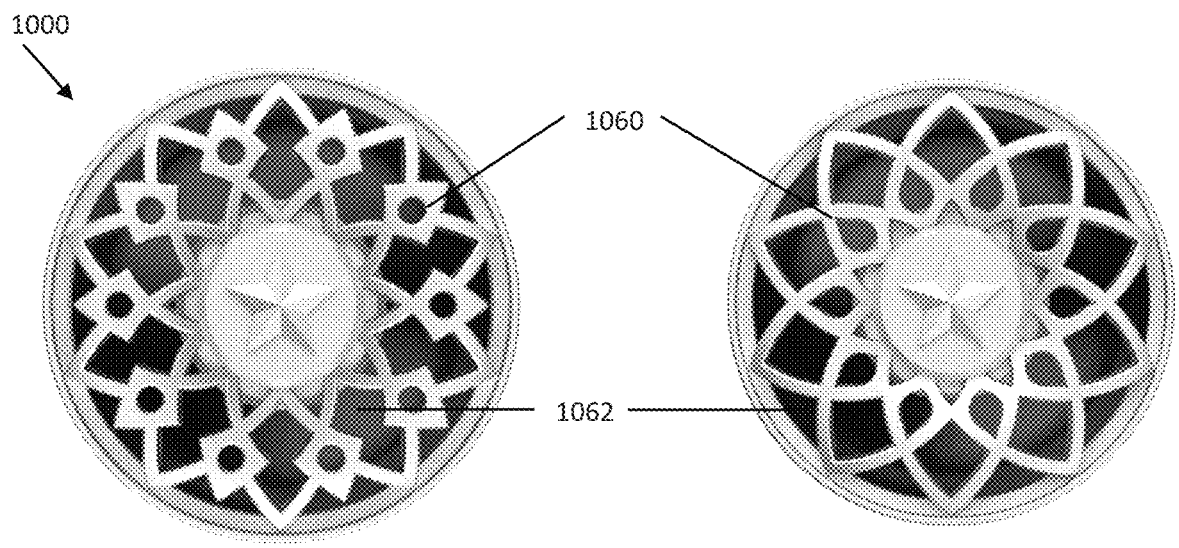
FIG. 11A
FIG. 11B
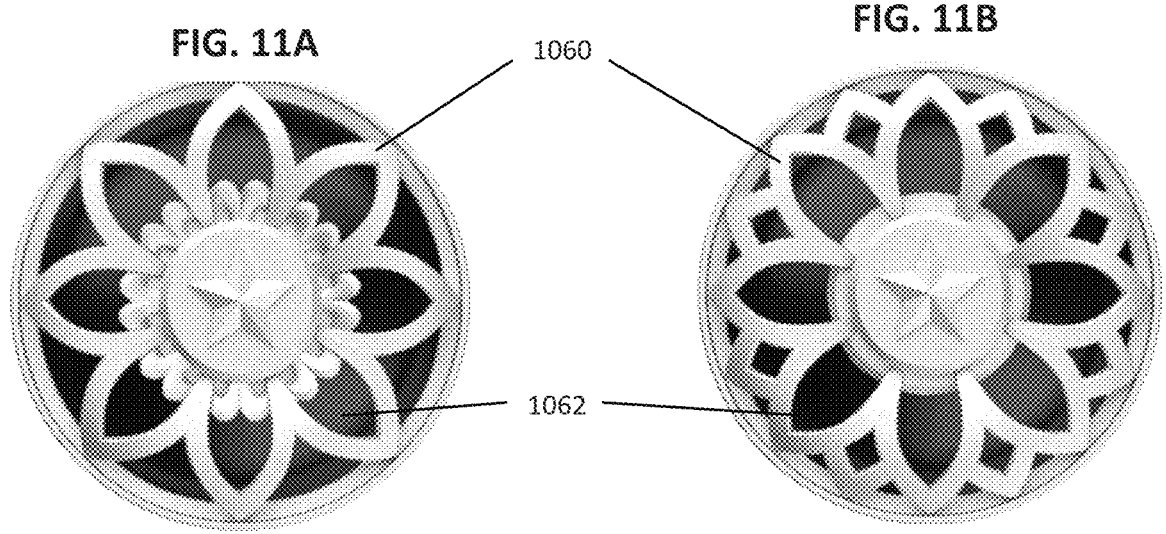
FIG. 11C
FIG. 11D
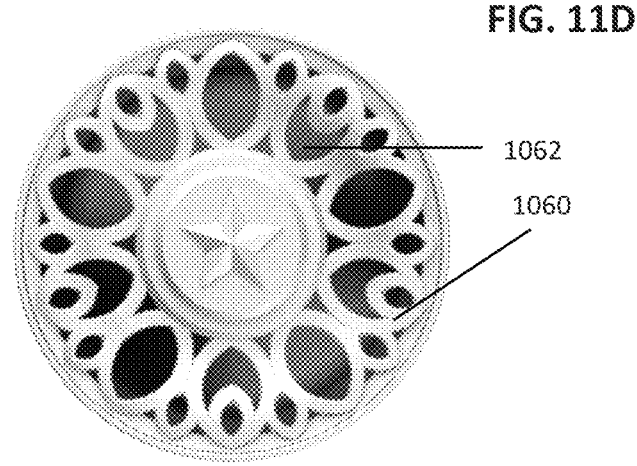
FIG. 11E

VEHICLE WHEEL WITH HIDDEN COLORED SURFACES

FIELD OF THE INVENTION

The invention relates generally to a vehicle wheel and, more specifically, to a vehicle wheel that reflects one or more colors of an optically aligned colored surface off of at least a portion of the wheel.

BACKGROUND OF THE INVENTION

A wheel disc and hubcap are mounted to the wheel and hub of a vehicle, respectively. A hubcap is used to shield the wheel hub and wheel fasteners from dirt and moisture accumulation and also to provide a decorative aspect. Cars with stamped steel wheels often use a full wheel cover that conceals the entire wheel. Alternatively, the wheels themselves may have integrated designs so that no wheel cover is necessary.

Conventionally, wheels, wheel discs, and hubcaps are colored with paint or other color treatments. However, the paint can be readily scratched off or become dull on the hard surface of the wheel. To combat this, wheels, wheel discs, and hubcaps are made of metal alloy or are metal-plated to create various colors of metals. However, in order to create varying colors on the wheels using such techniques, the integrity and strength of the metal may be sacrificed. Furthermore, plating, similar to painting, wears off over time and, thus, is not durable either. It would, therefore, be desirable to provide a vehicle wheel with improved coloring that has longevity and durability without compromising the integrity of the wheel structure.

SUMMARY OF THE INVENTION

In one or more embodiments of the present disclosure, a wheel for a vehicle includes: a mount configured to mount the wheel to a hub of the vehicle; a colored substrate that is hidden from direct view from an outside environment when the wheel is mounted to the hub; and a contoured reflective surface optically aligned to reflect coloring of the colored substrate into view of the outside environment when the wheel is mounted, thereby appearing to alter a color of the reflective surface.

In one or more embodiments, the colored substrate may include a colored light, which is optionally a light emitting diode (LED). In other embodiments, the colored substrate may be embodied singly or as multiple colored substrates, each of the multiple substrates configured for removable attachment to the wheel. In other embodiments, the colored substrate is positioned underneath the mount or forms part of an inward facing surface of the mount. In some embodiments, the colored substrate is a sleeve that surrounds the mount.

In one or more embodiments, the reflective surface may include a generally paraboloidal reflective surface that is symmetric about a central axis.

In one or more embodiments, the wheel may further include a first set of radially extending spokes. In one or more embodiments, colored substrate may be positioned underneath or forming part of undersurfaces of the spokes. In other embodiments, the wheel may further include a second set of spokes positioned under the first set of spokes. The contoured reflective surface may include a set of contoured substrates positioned along the second set of spokes, thereby optically reflecting the set of colored substrates via the second set of spokes.

In one or more embodiments, the wheel may further include a lid configured to cover the mount. In one or more embodiments, the lid includes an aperture or cutaway through which the reflective surface is viewed. In one or more embodiments, the lid is configured to interchangeably accept a plurality of different colored substrates, thereby providing a plurality of different colors for refection. In one or more embodiments, the lid may rotate freely about a central axis.

In one or more embodiments, the reflective surface may include a plurality of surface features, each independently selected from the group consisting of engraved, undulated, corrugated, hammered, grated, divoted, dimpled, checkered, and stepped.

In one or more embodiments, the wheel is a monolithic structure.

In one or more embodiments, the colored substrate includes a plurality of different colors. The plurality of different colors may be arranged so that a first colored region along the reflective surface is surrounded by a second colored region.

In one or more embodiments, the method of changing wheel colors on an automobile, include the following: providing the wheel, which is mounted to the hub of the automobile, the wheel configured to interchangeably accept a plurality of different colored substrates that are colored differently; and interchanging one colored substrate for another within the wheel.

The scope of the invention is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 11A-G are pictorial diagrams showing several views of other exemplary embodiments of a wheel with a lid secured thereto in accordance with one or more embodiments of the present disclosure.

Embodiments of the present disclosure and their advantages are best understood by referring to the detailed description that follows. It should be appreciated that like reference numerals are used to identify like elements illustrated in one or more of the figures.

DETAILED DESCRIPTION OF THE INVENTION

The present invention is based on a wheel for a vehicle and corresponding methods. In particular, the wheel provides durable and interchangeable ornamentations without affecting the structural integrity of the wheel.

Figure 1A:
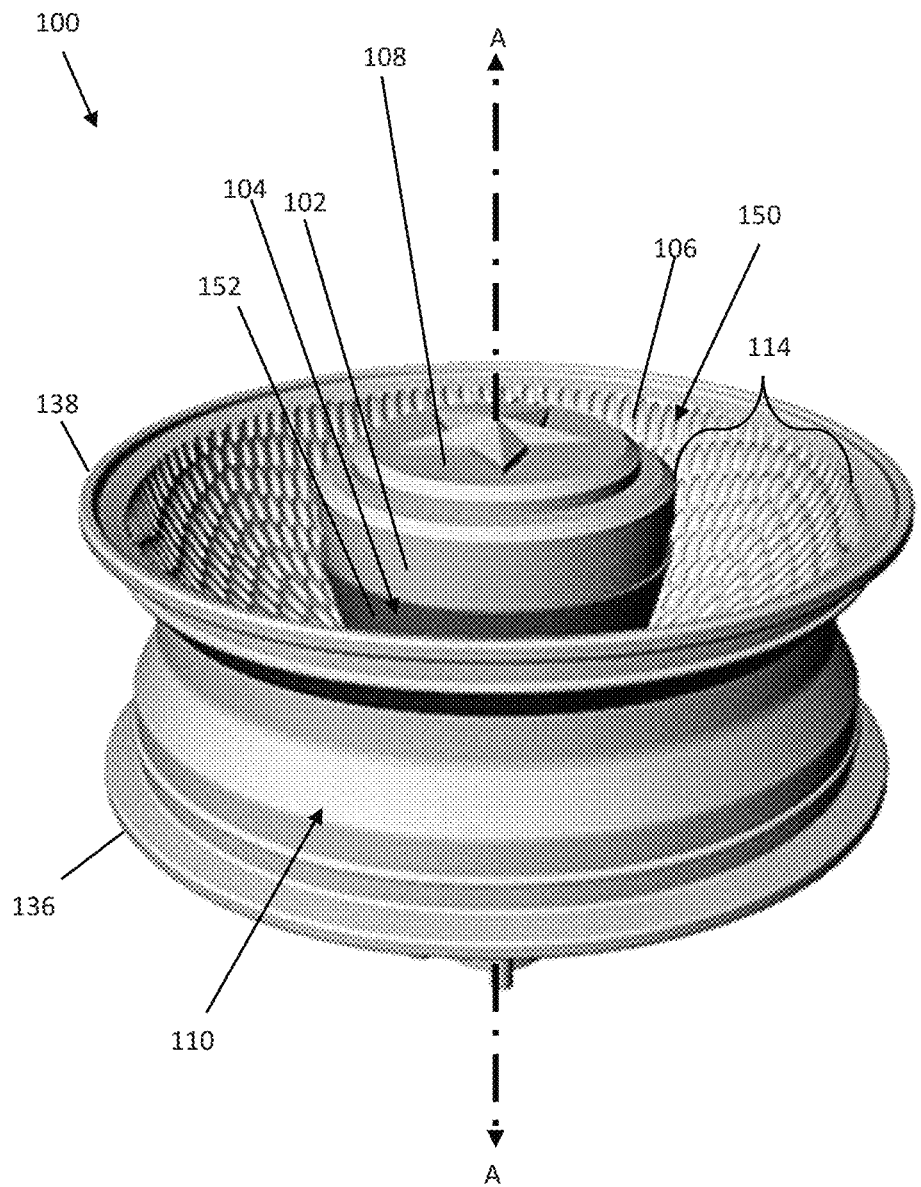
FIGS. 1A-IE are pictorial diagrams showing several views of an exemplary embodiment of a vehicle wheel 100 in accordance with one or more embodiments of the present disclosure.

Referring now to the drawings, which are shown for purposes of illustrating embodiments of the present invention only and not for the purposes of limiting the same, FIGS. 1A-1E are pictorial diagrams showing several views of an exemplary embodiment of a vehicle wheel 100 in accordance with one or more embodiments of the present disclosure. FIG. 1A shows a perspective view of wheel 100 in accordance with one or more embodiments of the present disclosure. In one or more embodiments, wheel 100 includes a mount 102, a rim 110, one or more colored substrates 104, and a base 150 (e.g. a wheel disc). In one or more embodiments, base 150 includes one or more contoured reflective surfaces 106. In one or more embodiments, rim 110 includes an inner lip 136 and an outer lip 138. Outer lip 138 faces an outside environment 5 (shown in FIG. 1C), and inner lip 136 is positioned opposite of outer lip 138 on rim 110 so that inner lip 136 faces an undercarriage of a vehicle (e.g., undercarriage of vehicle 9 shown in FIG. 2C) when wheel 100 is mounted on the vehicle. In one or more embodiments, wheel 100 may also include a hubcap 108, which covers at least a portion of mount 102 to at least prevent dirt and moisture from accumulating on and damaging mount 102. In one or more embodiments, wheel 100 may also include a cavity 114. Cavity 114 may be defined by at least base 106 and/or rim 110. For example, cavity 114 may be a toroid space defined by reflective surface 106 of base 150, mount 102, and outer lip 138 of rim 110.

In one or more embodiments, wheel 100 has a central axis A. When wheel 100 is mounted to a vehicle (e.g., vehicle 9 shown in FIG. 2C), wheel 100 may be rotatable about central axis A. In one or more embodiments, rim 110 is symmetric about central axis A and may be concentric to mount 102 so that mount 102 and rim 110 share central axis A.

In one or more embodiments, base 150 may be defined by rim 110. Mount 102 may be configured to attach to base 150 so that reflective surface 106 of base 150 is disposed between mount 102 and rim 110. In one or more embodiments, reflective surface 106 may be position adjacent to colored substrate 104, which may be secured to mount 102 as discussed further herein. Colored substrate 104 may be hidden from an outside environment (e.g., an environment outside of cavity 114). Preferably, colored substrate 104 is hidden from direct view in that the ordinary viewer looking towards the wheel 100 only views reflected color. In one or more embodiments, colored substrate 104 includes one or more colored surface, such as colored surface 152. In other embodiments, colored substrate 104 may include a plurality of colored surfaces, such as colored surfaces 152a-d (shown in FIG. 2B), that are each a different color and may be arranged in any orientation relative to each other.

Figure 1B:
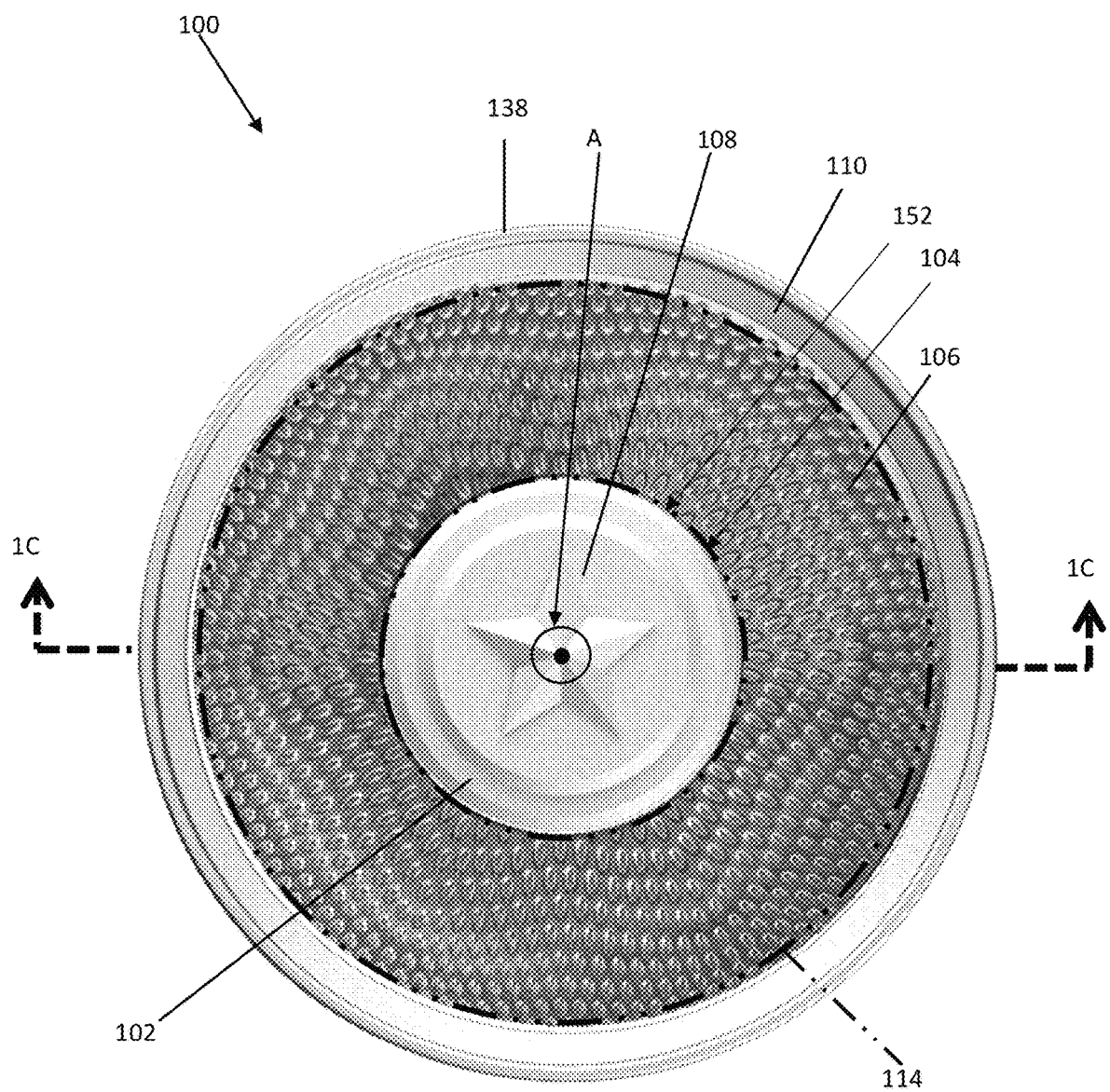

FIG. 1B is a front plan view of wheel 100 in accordance with one or more embodiments of the present disclosure. As shown in FIG. 1B, colored substrate 104 and corresponding colored surface 152 may be hidden and, thus, not directly visible to external environment 5 (shown in FIG. 1C) outside of cavity 114. That is, the colored surface 152 is hidden from direct view.

In one or more embodiments, colored surface 152 may be any desired color. For example, colored surface 152 of colored substrate 104 (shown in FIG. 1A) may be the color blue. In one or more embodiments, light from colored surface 152 may reflect off of reflective surface 106 and traverse through cavity 114 to an outside environment 5 (shown in FIG. 1C) so that reflective surface 106 appears to be the desired color of colored surface 152 of colored substrate 104 to an observer in the outside environment. For example, reflective surface 106 has a blue wave-like coloration to an observer positioned in outside environment 5.

FIG. 1C is a cross-sectional side plan view of wheel 100 taken along line 1C-1C of FIG. 1B in accordance with one or more embodiments of the present disclosure. In one or more embodiments, mount 102 is configured to mount wheel 100 to a hub of a vehicle (e.g., an automobile or a motorcycle). In one or more embodiments, mount 102 may extend from reflective surface 106 along axis A for a length.

In one or more embodiments, a reflected ray of light from colored surface 152 (e.g., reflected color 10) may reflect off of reflective surface 106. For example, an incident ray from hidden colored surface 104 strikes reflective surface 106 and then the reflected ray reflects off of reflected surface 106 into outside environment 5 where an observe can see the reflected color 10. In one or more embodiments, reflective surface 106 is concave so that reflected ray 10 reflects outside of cavity 114 and into outside environment 5 without colored surface 152 being visible to outside environment 5.

Selective display of colored surface 152 may be performed by determining the spatial positioning of reflective surface 106 and positioning or angling of desired colored surface 152 such that an optical path vector intersects the desired portion of colored surface 152. Such calculations may involve determining the angle or position of reflective surface 106 and the corresponding relation to the position of colored surface 152 as well as the desired optical path. Once determined, angling colored surface 152 may involve positioning colored substrate 104 on wheel 100 until the desired reflection (e.g., reflected color 10) occurs or such that the angle of incidence equals the angle of reflection. In one or more embodiments, colored substrate 104 may be positioned relative to reflective surface 106 so that the optical path vector of, for example, reflected color 10, exits cavity 114 relatively perpendicular to central axis A.

FIG. 1D shows an exploded perspective view of wheel 100 in accordance with one or more embodiments of the present disclosure. Wheel 100 includes rim 110, colored substrate 104, base 150 with reflective surface 106, mount 102 and hubcap 108. In one or more embodiments, mount 102 may be a monolithic structure or may have numerous components (e.g., disk 122 and post 120). For example, mount 102 may include disk 122, post 120, and one or more bolts 116. Bolts 116 may traverse through holes 118 of disk 122 and holes 124 in base 150 (shown in FIG. 1E) to secure wheel 100 to a vehicle. Bolts 116 and holes 118 may be covered with hubcap 108 for aesthetic purposes or for protective purposes (e.g., to prevent moisture and dirt from damaging mount 102).

In one or more embodiments, colored substrate 104 may be configured for removable attachment to wheel 100 (e.g., colored substrates 104 are interchangeable). For example, colored substrate 104 may be interchangeably coupled to mount 102. Colored substrate 104 is hidden from the view of outside environment 5 when wheel 100 is mounted to a vehicle. In one or more embodiments, colored substrate 104 may be any shape, size, color, or texture as understood by one skilled in the art. For example, colored surface 152 of colored substrate 104 may be smooth. In other examples, colored substrate 104 may be rippled, dimpled, etched, engraved, undulated, corrugated, fluted, hammered, grated, diveted, checkered, stepped, or any combinations thereof. As shown in the exemplary embodiment of FIG. 1D, colored surface 104 may be the shape of a conical frustum that wraps about mount 102.

A method of changing wheel colors on an automobile (e.g., vehicle 9) may include: providing wheel 100 mounted to the hub of the automobile, wheel 100 configured to interchangeably accept a plurality of different colored substrates 104 having a plurality of different colored surfaces 152; and interchanging one colored substrate 104 for another colored substrate 104 within wheel 100.

In one or more embodiments, colored substrate 104 may be made from paint, enamel, stone, resin, colored lights (e.g., light emitting diodes (LEDs)), or other color treatments. In one or more embodiments, colored substrate 104 may be mounted on mount 102, base 150, spokes (e.g., spokes 428,430 of FIGS. 4A-H), rim 110, or any other location that allows colored substrate 104 to be hidden from outside environment 5.

As understood by one skilled in the art, reflective surface 106 may be any shape, size, or texture. For example, reflective surface 106 of wheel 100 may include a generally paraboloid reflective surface that is symmetric about central axis A. In one or more embodiments, reflective surface 106 may be a shape or size that is complementary to the shape and size of colored substrate 104 so that colored substrate 104 may be hidden while reflective surface 106 displays the one or more colors of colored surface 152 to outside environment 5. In one or more embodiments, contoured reflective surface 106 is optically aligned to reflect colored surface 104 into view of an outside environment 5 when wheel 100 is mounted to a vehicle, thereby appearing to alter a color of reflective surface 106. In one or more embodiments, base 150 may include a single reflective surface 106 (as shown in FIGS. 1A-1E). In other embodiments, base 150 may include a plurality of reflective surfaces 106, as discussed further herein. In one or more embodiments, reflective surface 106 may be made from any material suitable for use with a vehicle (e.g., steel, aluminum, or any other strong and reflective material).

In FIGS. 1A-1E, the reflective surface 106 is shown as being dimpled; however, as it may be understood by one skilled in the art, reflective surface 106 may have one or more various surface textures. Reflective surface 106 may include a plurality of surface features, each independently selected from the group consisting of engraved, undulated, corrugated, hammered, grated, diveted, dimpled, checkered, and stepped. In one or more embodiments, reflective surface 106 of base 150 may be coated with a non-reflective coating to prevent reflection in certain areas of reflective surface 106 to create a design within reflective surfaces 106.

Figure 1E:
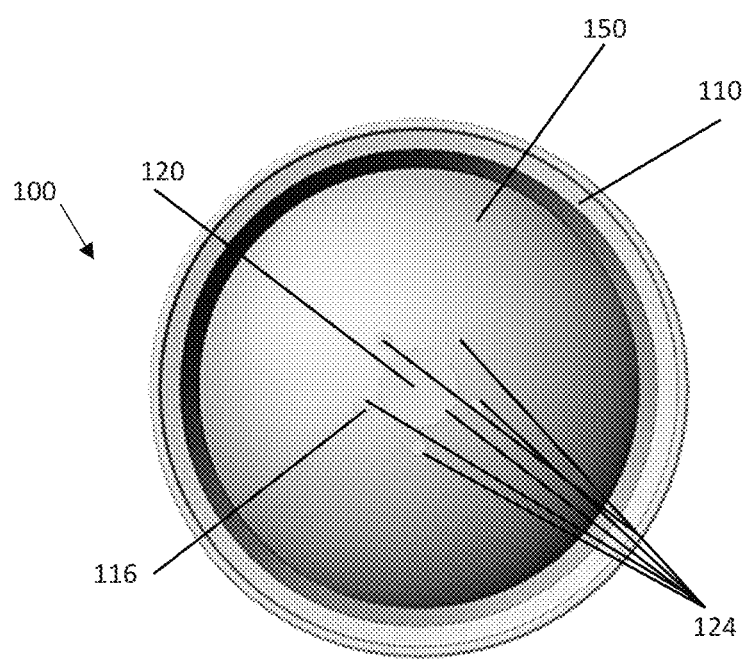

FIG. 1E shows a rear plan view of wheel 100 in accordance within one or more embodiments of the present disclosure. In one or more embodiments, mount 102 may adjoin base 150. In one or more embodiments, mount 102 may traverse through base 150. For example, post 120 and screws 116 may traverse through base 150 via openings 124 so that mount 102 may secure to a vehicle.

In one or more embodiments, wheel 100 may be a monolithic structure made, for example, from a mold. In other embodiments, wheel 100 may include various separate components that are assembled together. In one or more embodiments, colored surface 152 includes a plurality of different colored surfaces. In one or more embodiments, colored surface 152 may be positioned underneath mount 102 or form part of an inward facing surface (e.g., surface facing a cavity of wheel 100, such as cavity 114) of mount 102.

Figure 2A:
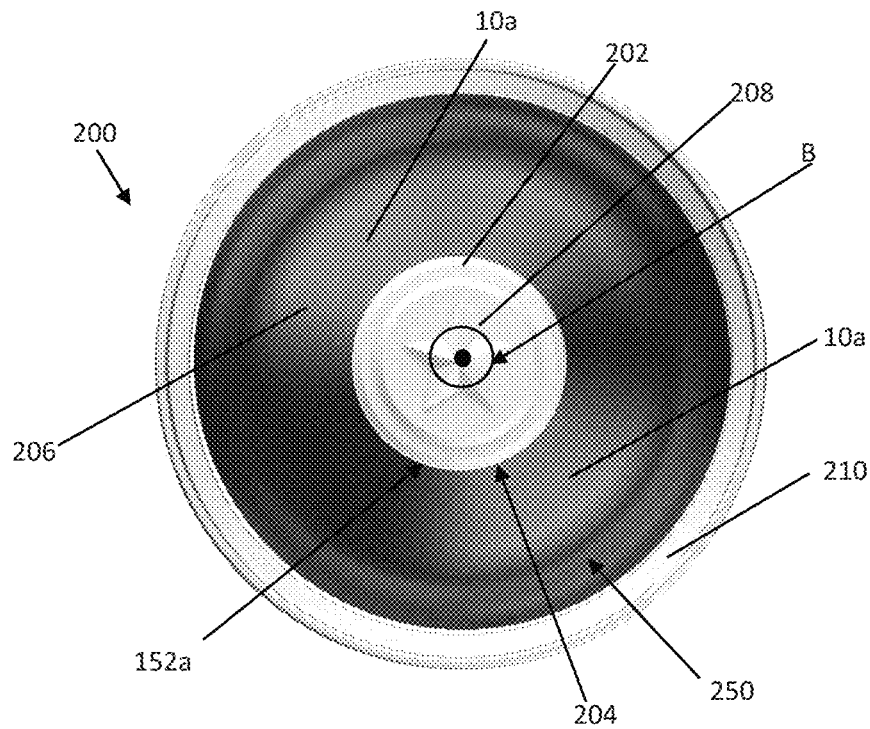
FIGS. 2A and 2B are pictorial diagrams showing several views of another exemplary embodiment of a wheel in accordance with one or more embodiments of the present disclosure.
Figure 2B:
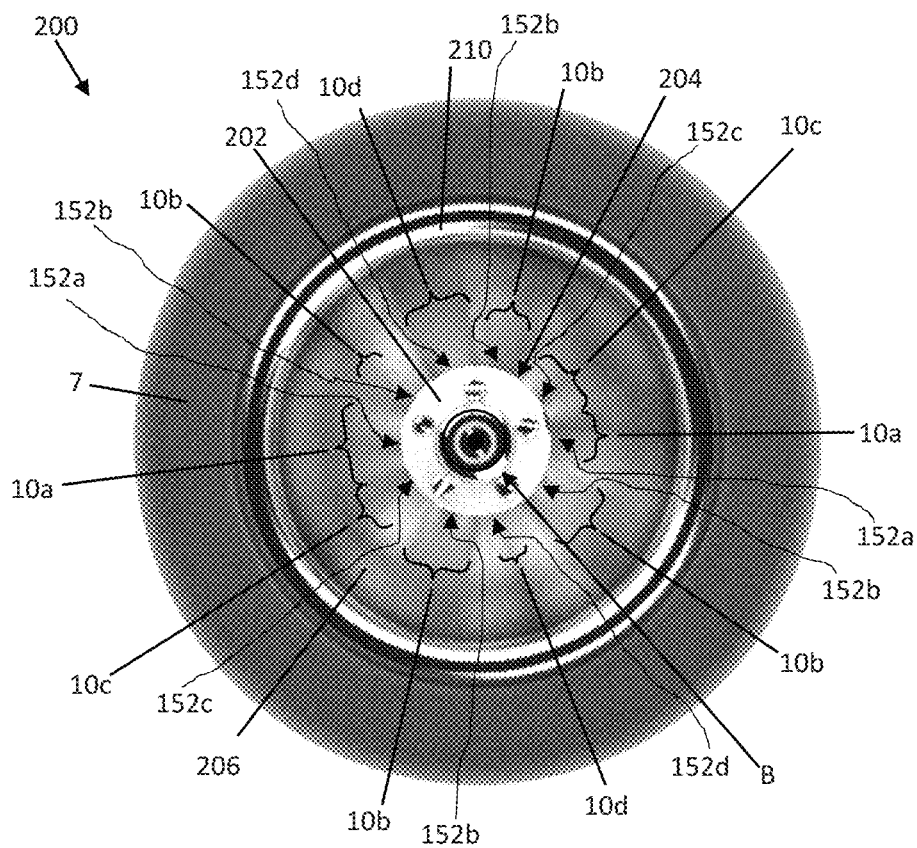

FIGS. 2A and 2B are pictorial diagrams showing a front plan view of another exemplary embodiment of the wheel, a wheel 200, in accordance with one or more embodiments of the present disclosure. In one or more embodiments, wheel 200 includes a mount 202, a colored substrate 204 with one or more colored surfaces 152a-d, a base 250, a hub cap 208, and a rim 210. Base 250 of wheel 200 include a paraboloidal reflective surface 206 that is smooth, polished, and symmetric about a central axis B.

In FIGS. 2A and 2B, colored substrate 204 is wrapped about mount 202 (e.g., mount 102 traverses through colored substrate 204). As shown in FIG. 2A, colored substrate 204 may be a solid color. For example, colored substrate may have only one colored surface 152a, providing a first reflected color 10a. As shown in FIG. 2B, colored substrate 204 may have a plurality of colored surfaces 152a-d, providing a first reflected color 10a, a second reflected color 10b, a third reflected color 10c, and a fourth reflected color 10d, respectively. For example, light reflects off of first colored surface 152a and onto reflective surface 206, so that the portion of surface 206 that reflected color 10a reflects off of appears to be the same color as colored surface 152a from outside environment 5. Similarly, light reflected off of second colored surface 152b, third colored surface 152c, and fourth colored surface 152d each reflect onto selective portions of reflective surface 206 so that base 250 displays bands of color.

In one or more embodiments, colored substrate 204 may be interchangeable. For example, solid-colored substrate 204 of FIG. 2A may be interchanged for multicolored colored substrate 204 of FIG. 2B.

As understood by one skilled in the art, two or more colored surfaces (e.g., colored surfaces 152a-d) of a multicolored substrate (e.g., colored substrate 204) may be placed in any arrangement (e.g., design or pattern). For example, colored substrate 204 may be spotted, striped, checkered, marbled, or any other design or arrangement of colored surfaces 152a-d. Though four different colored surfaces are discussed herein, as understood by one skilled in the art, any quantity of different colored surfaces may be used.

Figure 2C:
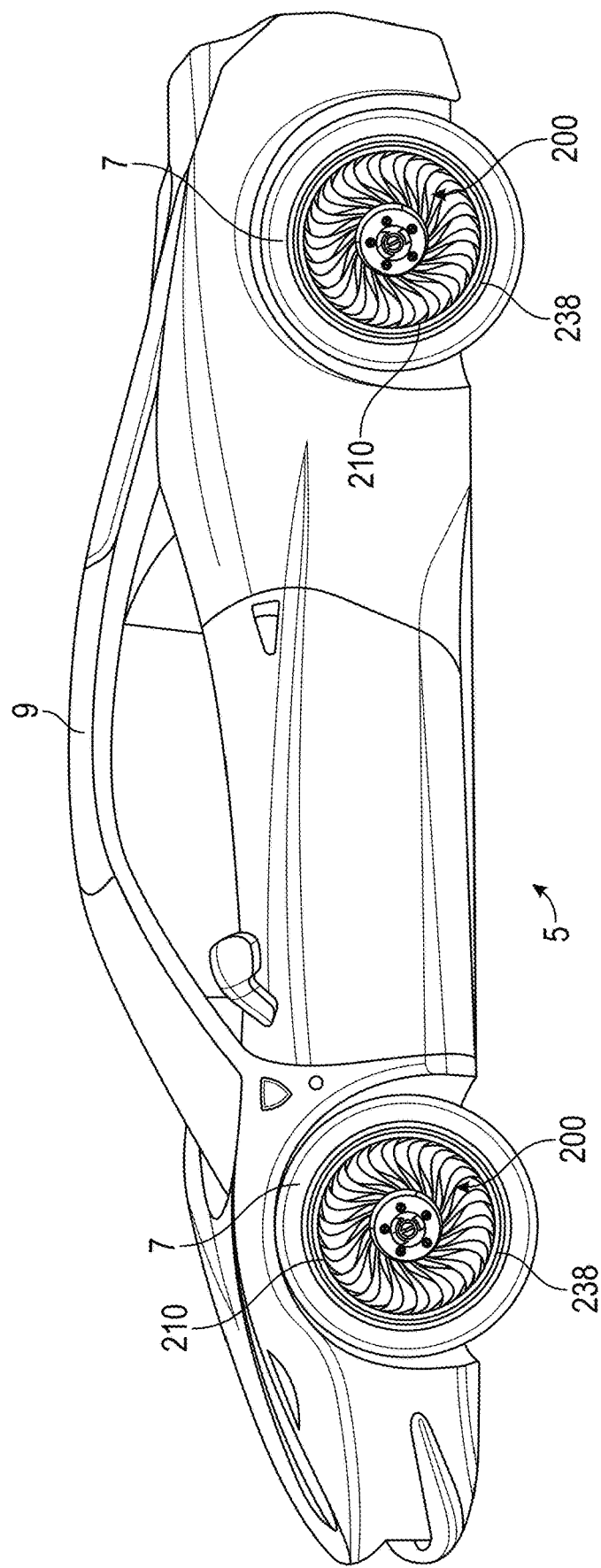
FIG. 2C is a pictorial diagram showing a front plan view of the secondary exemplary use of the wheel mounted to a vehicle in accordance with one or more embodiments of the present disclosure.

FIG. 2C shows an exemplary use of wheel 200 in accordance with one or more embodiments of the present disclosure. Wheel 200 may have a tire 7 mounted to rim 210. Wheel 200 may then be mounted to vehicle 9 (e.g., automobile) so that outer lip 238 of rim 210 faces outside environment 5. Though the exemplary use is shown with wheel 200, any of the exemplary embodiments of the wheel discussed herein may be used for the same exemplary use, as understood by one skilled in the art.

The following figures show exemplary embodiments of the wheel, where the wheel may also include a structural support or lid, but is still configured to mount on vehicle 9.

Figure 3A:
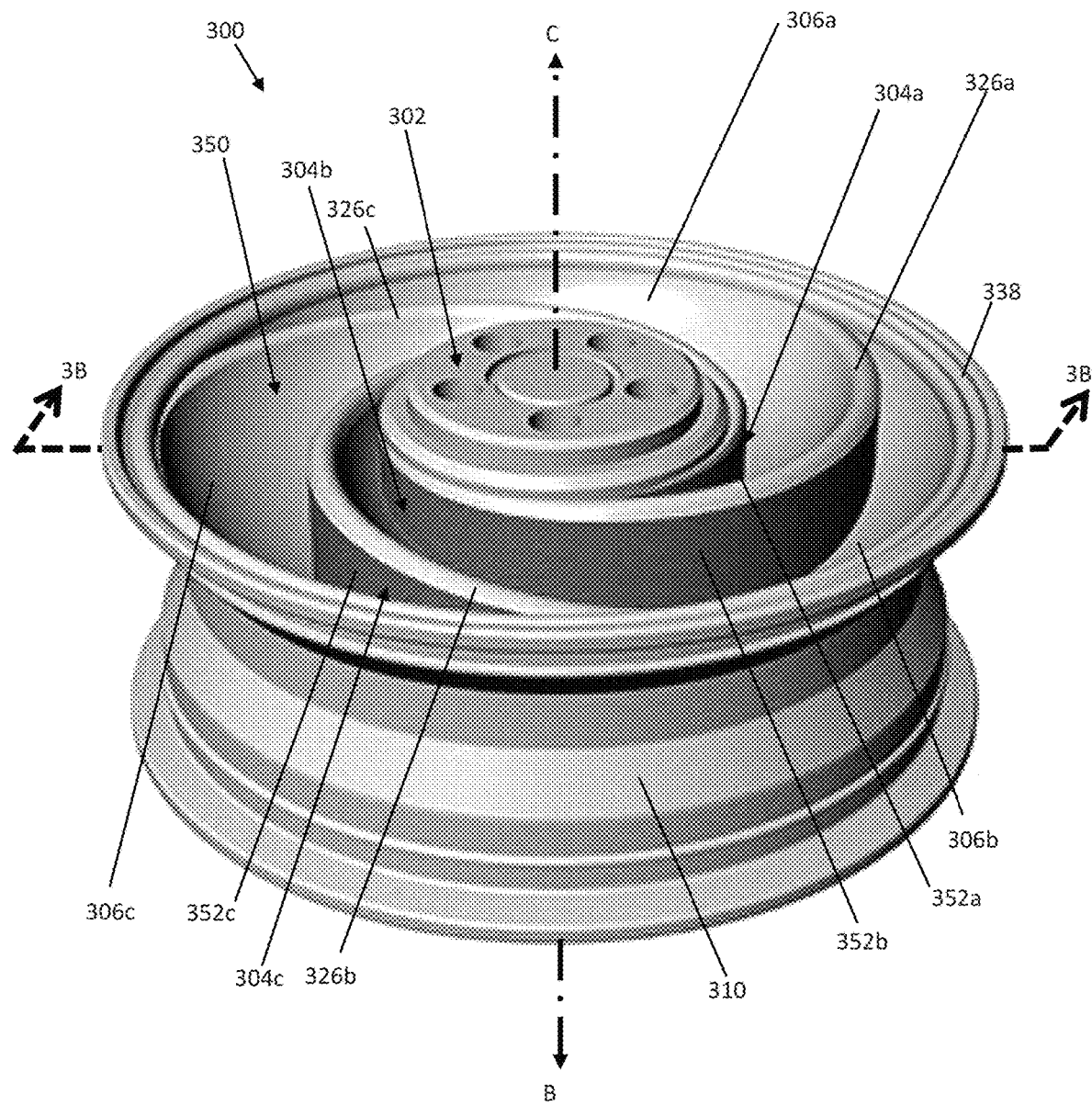
FIGS. 3A-3E are pictorial diagrams showing several views of another exemplary embodiment of a wheel in accordance with one or more embodiments of the present disclosure.

FIGS. 3A-3E are pictorial diagrams showing several views of another exemplary embodiment of the wheel, a wheel 300, in accordance with one or more embodiments of the present disclosure. FIG. 3A shows a perspective view of wheel 300 in accordance with one or more embodiments of the present disclosure. In one or more embodiments, wheel 300 may include a plurality of colored substrates 304a,b,c, that each have at least one corresponding colored surfaces (e.g., colored surfaces 352a,b,c). Wheel 300 may also include a contoured base 350 that includes a plurality of reflective surfaces 306a,b,c.

In one or more embodiments, reflective surfaces 306a,b,c may each be curved, concave surfaces. In one or more embodiments, reflective surfaces 306a,b,c may radially extend from mount 302 to rim 310 (e.g., outer lip 338 of rim 310) along an arcuate path to create ridges 326a,b,c (e.g., spokes). For example, reflective surfaces 306a,b,c may each spiral outward from mount 302 and about central axis C to create sloped surfaces. In one or more embodiments, colored surfaces 304a,b,c may each define a cavity 314a, 314b, and 314c, respectively, (shown in FIG. 3B) with reflective surfaces 306a,b,c, respectively.

In one or more embodiments, colored substrates 304a,b,c may be removably attached to base 350 (e.g., at ridges 326a,b,c). For example, colored substrates 304a,b,c may each be secured to base 350 so that colored surfaces 352a,b,c are each optically aligned with corresponding reflective surfaces 306a,b,c, respectively, to reflect colored surfaces 352a,b,c into view of outside environment 5. In one or more embodiments, each colored surface 352a,b,c may be parallel to central axis C of wheel 300 so that colored surfaces 304a,b,c are hidden from outside environment 5. In other embodiments, colored surfaces 352a,b,c may be angled relative to central axis C.

Figure 3B:
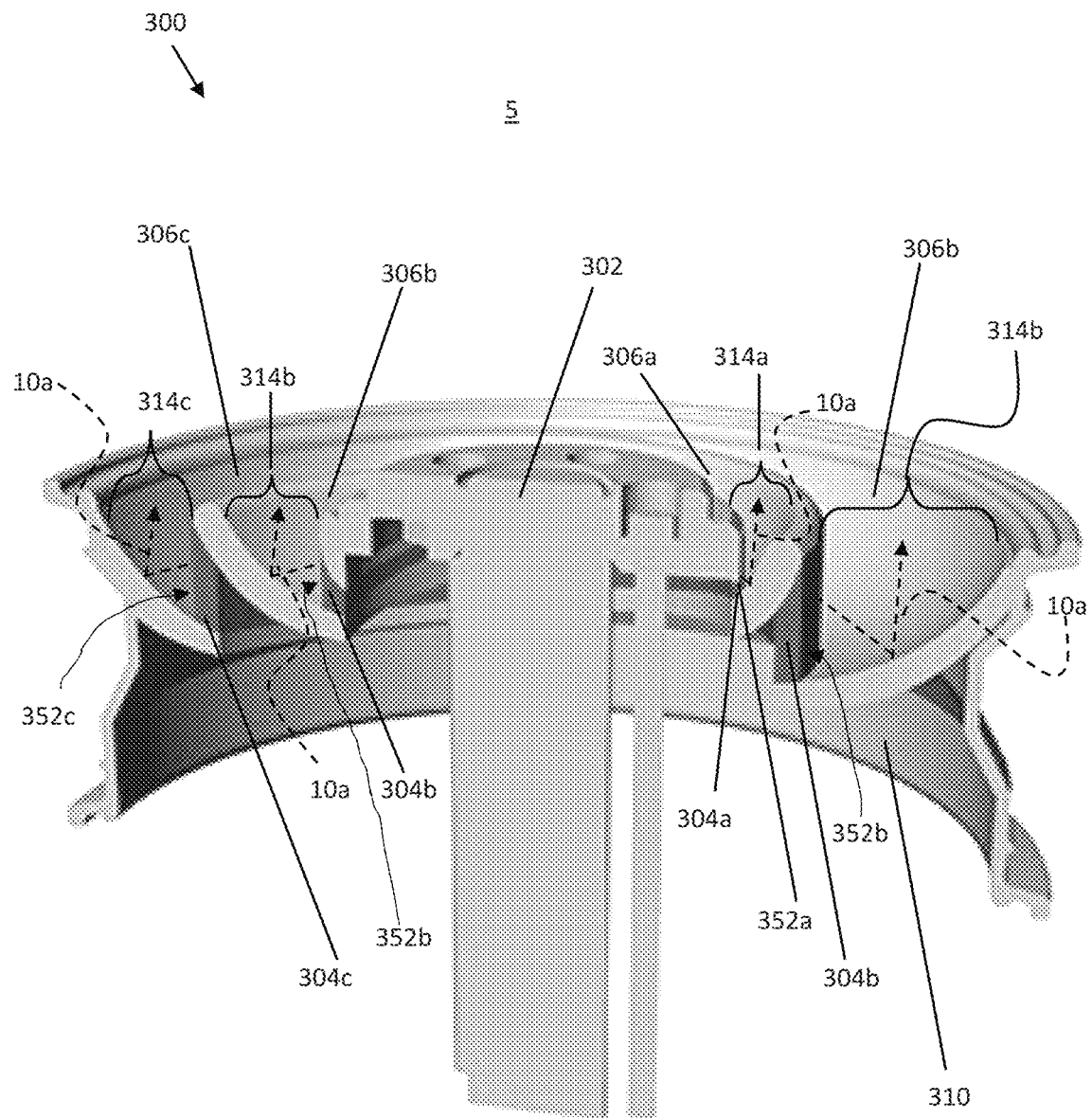

FIG. 3B shows a cross-sectional perspective view of wheel 300 taken along line 3B-3B of FIG. 3A in accordance with one or more embodiments of the present disclosure. A reflection (e.g., first colored reflections 10a) of each colored surface 352a,b,c may reflect off the corresponding adjacent reflective surface 306a,b,c, respectively. For example, an incident ray from colored surface 352a may traverse through cavity 314a and reflect off of reflective surface 306a to create a reflection of a first color 10a that is visible to outside environment 5. As a result, reflective surface 306a will appear to be the same color as colored surface 352a to an observer in outside environment 5.

Figure 3C:
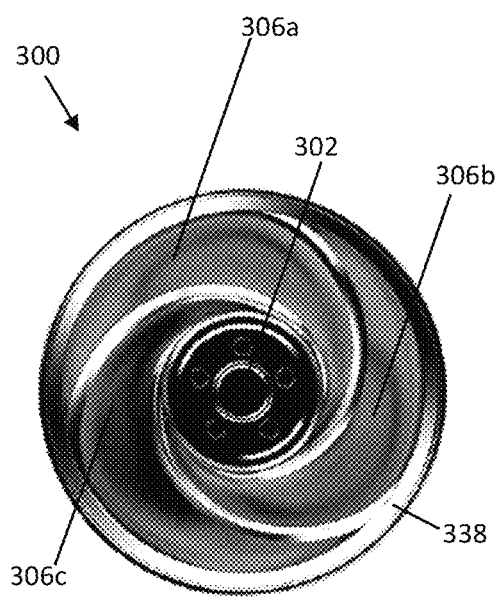

FIG. 3C shows a front plan view of wheel 300 in accordance with one or more embodiments of the present disclosure. Each reflected surface 306a,b,c may reflect a reflected color 10a so that wheel 300 appears to be colored. For example, wheel 300 may appear to be variations the color of the solid-colored colored surfaces 352a,b,c. In other embodiments, colored surfaces 352a,b,c may be different colors relative to each other.

Figure 3D:
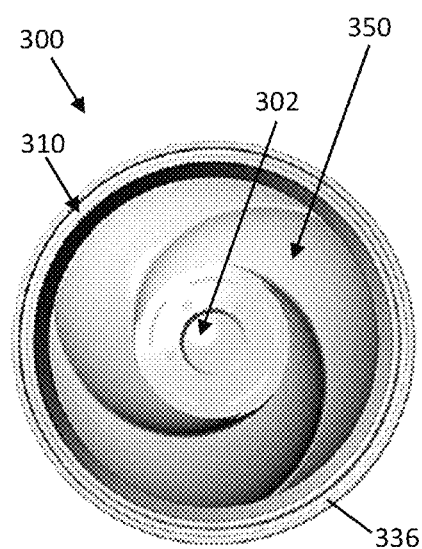

FIG. 3D shows a rear plan view of wheel 300 in accordance with one or more embodiments of the present disclosure. In one or more embodiments, the rear of wheel 300 (e.g., underside of base 350 and facing inner lip 336 of rim 310) will face the undercarriage of vehicle 9 when mounted thereto.

Figure 3E:
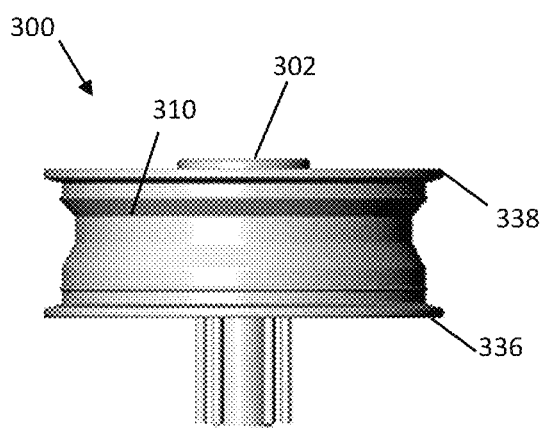

FIG. 3E shows a side plan view of wheel 300 in accordance with one or more embodiments of the present disclosure. In one or more embodiments, a tire (e.g., tire 7) may be mounted on rim 310 between inner lip 336 and outer lip 338.

FIGS. 4A-4H are pictorial diagrams showing several views of another exemplary embodiment of the wheel, wheel 400, in accordance with one or more embodiments of the present disclosure.

FIGS. 4A-4D show several views of wheel 400 in accordance with one or more embodiments of the present disclosure. In one or more embodiments, wheel 400 includes a mount 402, a base 450 having a plurality of reflective surfaces 406, one or more colored substrates 404 with one or more colored surfaces 452, a rim 410 having an inner lip 436 and an outer lip 438, and a support structure 456.

In one or more embodiments, mount 402 includes holes 418, which may receive hardware or fasteners (e.g., bolts 116 or threaded posts of a vehicle hub that are compatible with lug nuts) to secure wheel 400 to vehicle 9 (shown in FIG. 2C). In one or more embodiments, mount 402 may be a separate component or mount 402 may be an integrated component of support structure 456. In one or more embodiments, support structure 456 may include a plurality of integrated spokes (e.g., flared spokes 428 and/or straight spokes 430) that radially extend from mount 402 to rim 410 (e.g., outer lip 438). In one or more embodiments, reflective surfaces 406 are visible to outside environment 5 through apertures 426 (shown in FIG. 4G), which are between spokes 428 and 430.

Figure 4A:
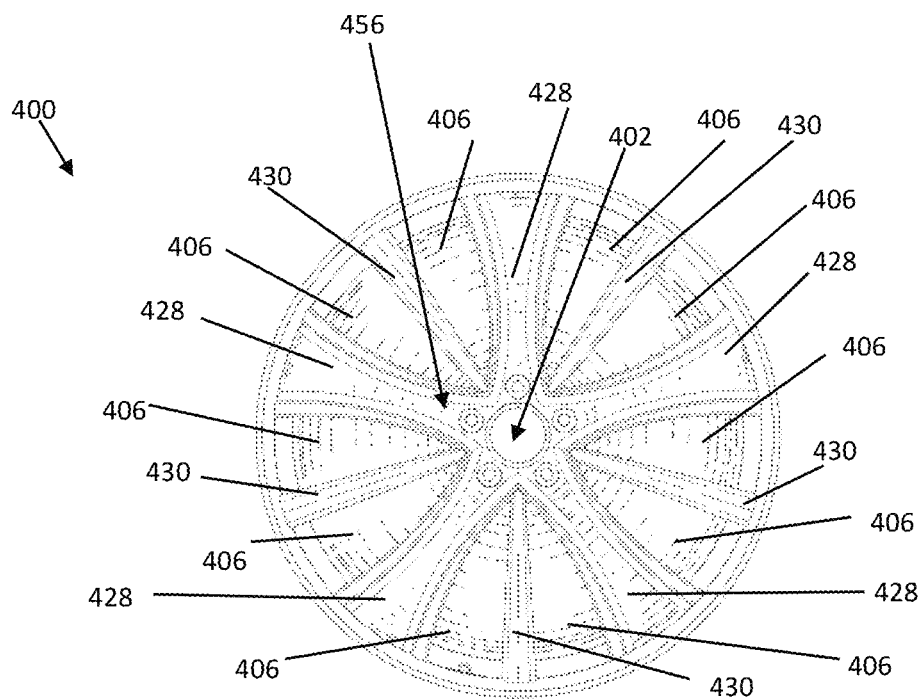
FIGS. 4A-4H are pictorial diagrams showing several views of another exemplary embodiment of a wheel with structural support in accordance with one or more embodiments of the present disclosure.
Figure 4B:
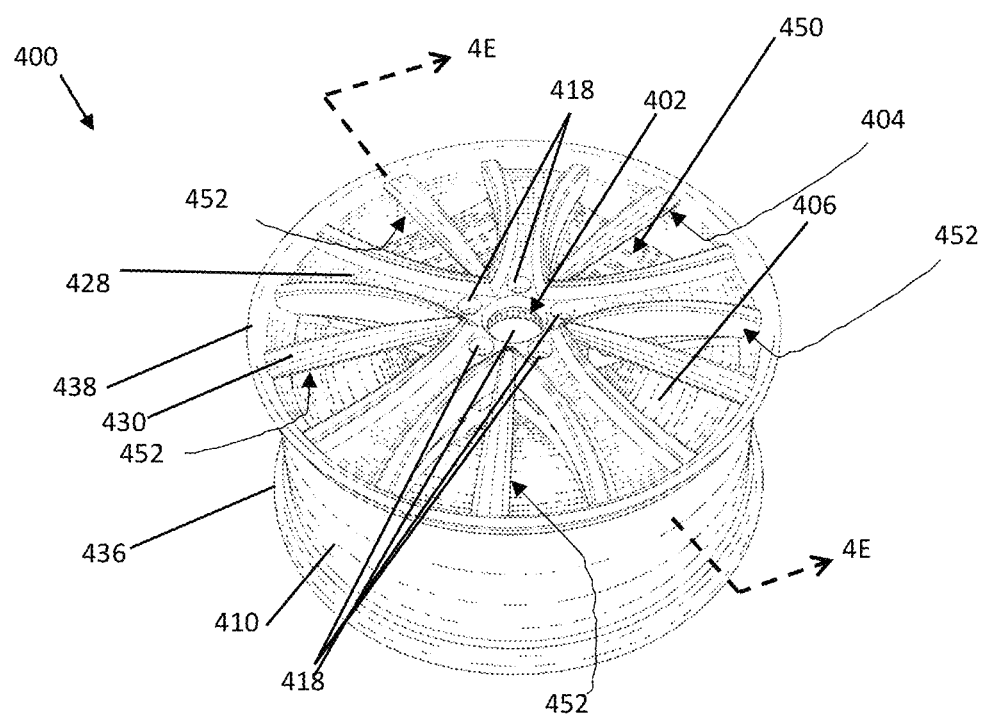
Figure 4C:
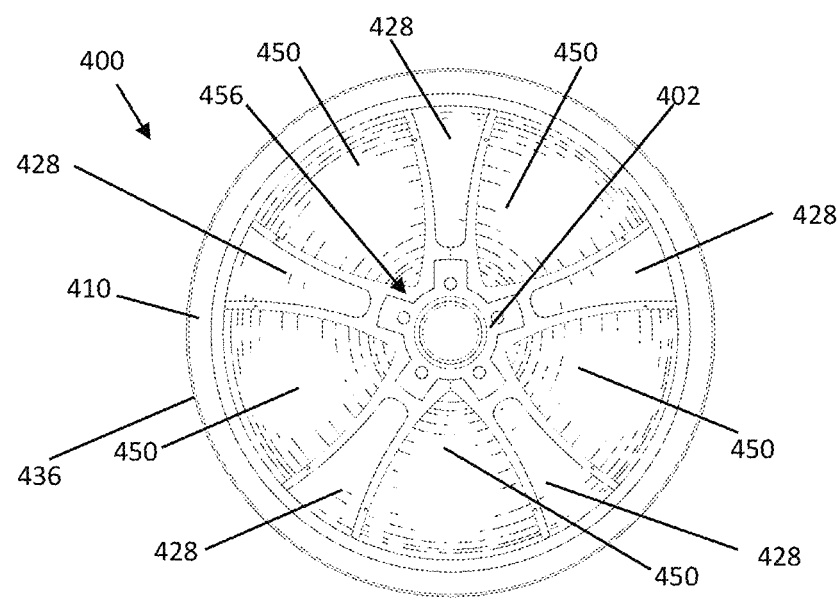
Figure 4D:
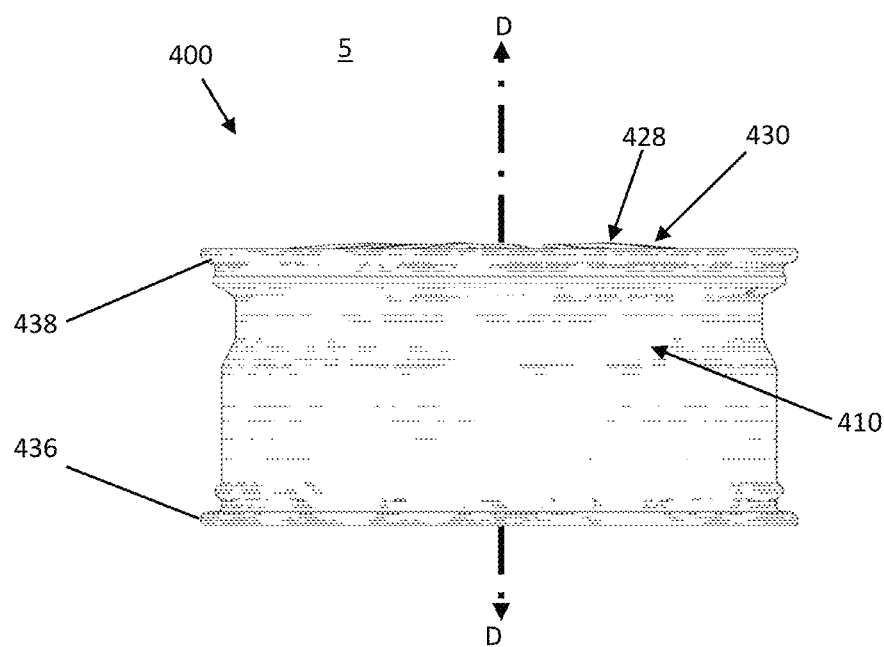

As shown in FIG. 4C, a rear view of wheel 400, base 450 may reside behind (e.g., closer to inner lip 436 and farther from outer lip 438) spokes 428 and 430. In one or more embodiments, reflective surfaces 406 may be individual components that can be stacked and/or staggered, or reflective surfaces 406 may be a monolithic component with a plurality of reflective surfaces (as shown in FIGS. 4A-H). In an exemplary embodiment, reflective surfaces 406 may each be a Reuleaux triangle shape and centrally joined, as shown in FIGS. 4A-4H. In other exemplary embodiments, reflective surfaces 406 may each be a vesical piscis shape. In other embodiments, each reflective surface 406 may be any shape or size that allows colored surfaces 452 to be optically aligned with corresponding reflective surfaces 406.

Figure 4E:
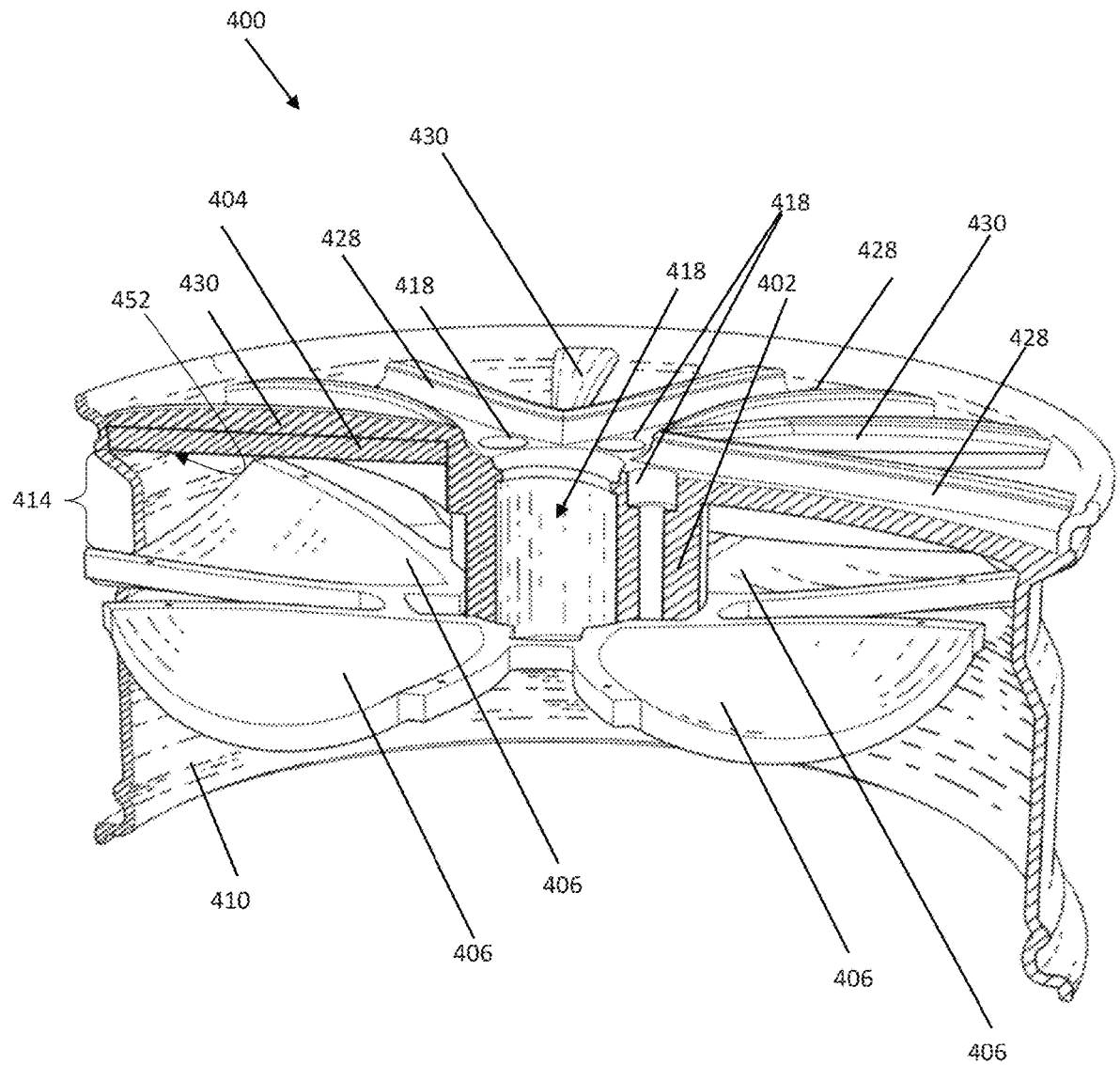
Figure 4F:
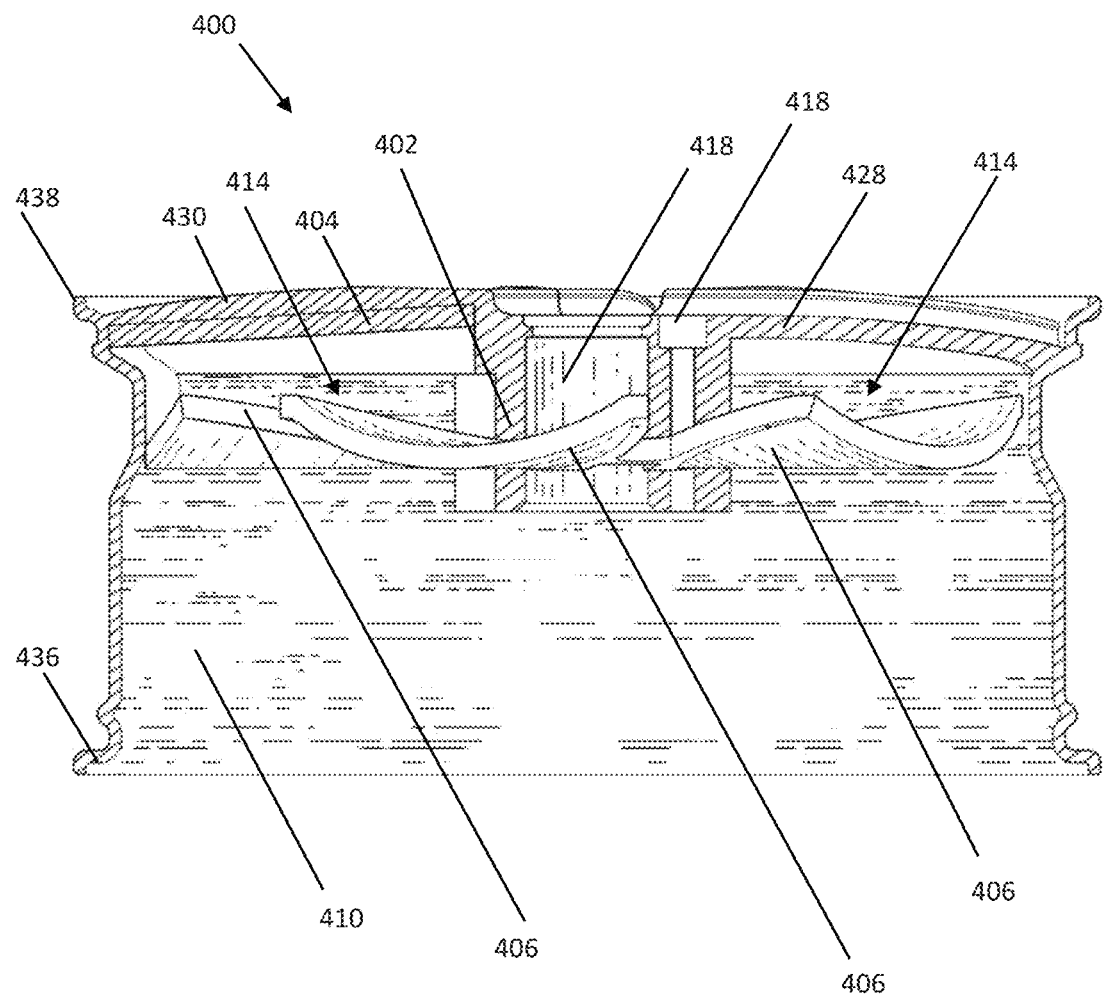

FIGS. 4E and 4F are pictorial diagrams showing partial cross-sectional views of wheel 400 taken along line 4E-4E of FIG. 4B in accordance with one or more embodiments of the present disclosure. In one or more embodiments, colored substrates 404 may be secured to an underside (e.g., rear) of support structure 456 so that colored surfaces 452 are hidden from outside environment 5 and disposed within cavity 414, which is defined by base 450, mount 412, rim 410, and support structure 456. In one or more embodiments, straight spokes 430 may each have a colored substrate 404 secured to an underside of each spoke 430 (e.g., facing corresponding reflective surface 406). In other embodiments, flare spokes 428 and straight spokes 430 may each have colored surfaces 404 disposed on the undersides.

Figure 4G:
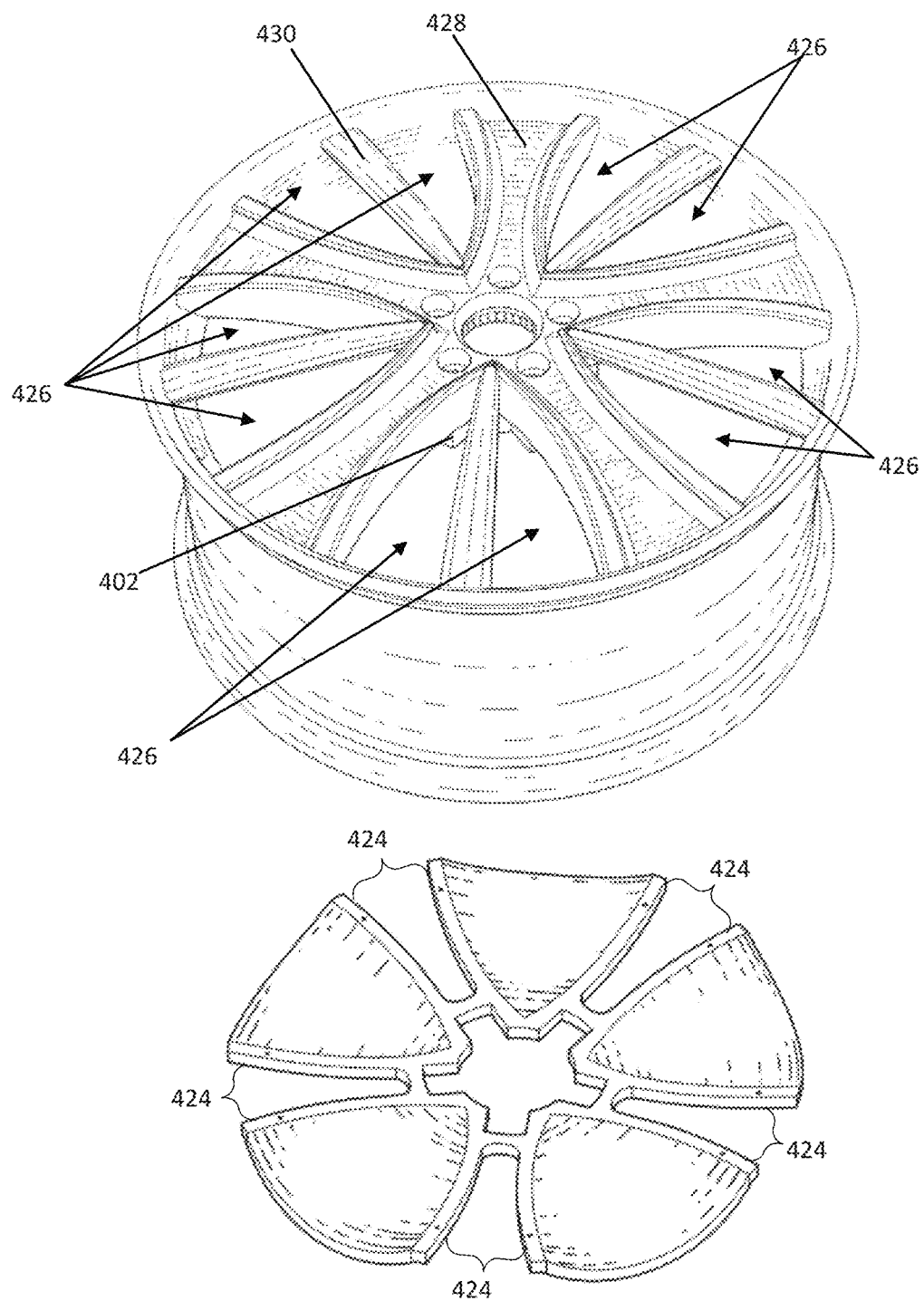
Figure 4H:
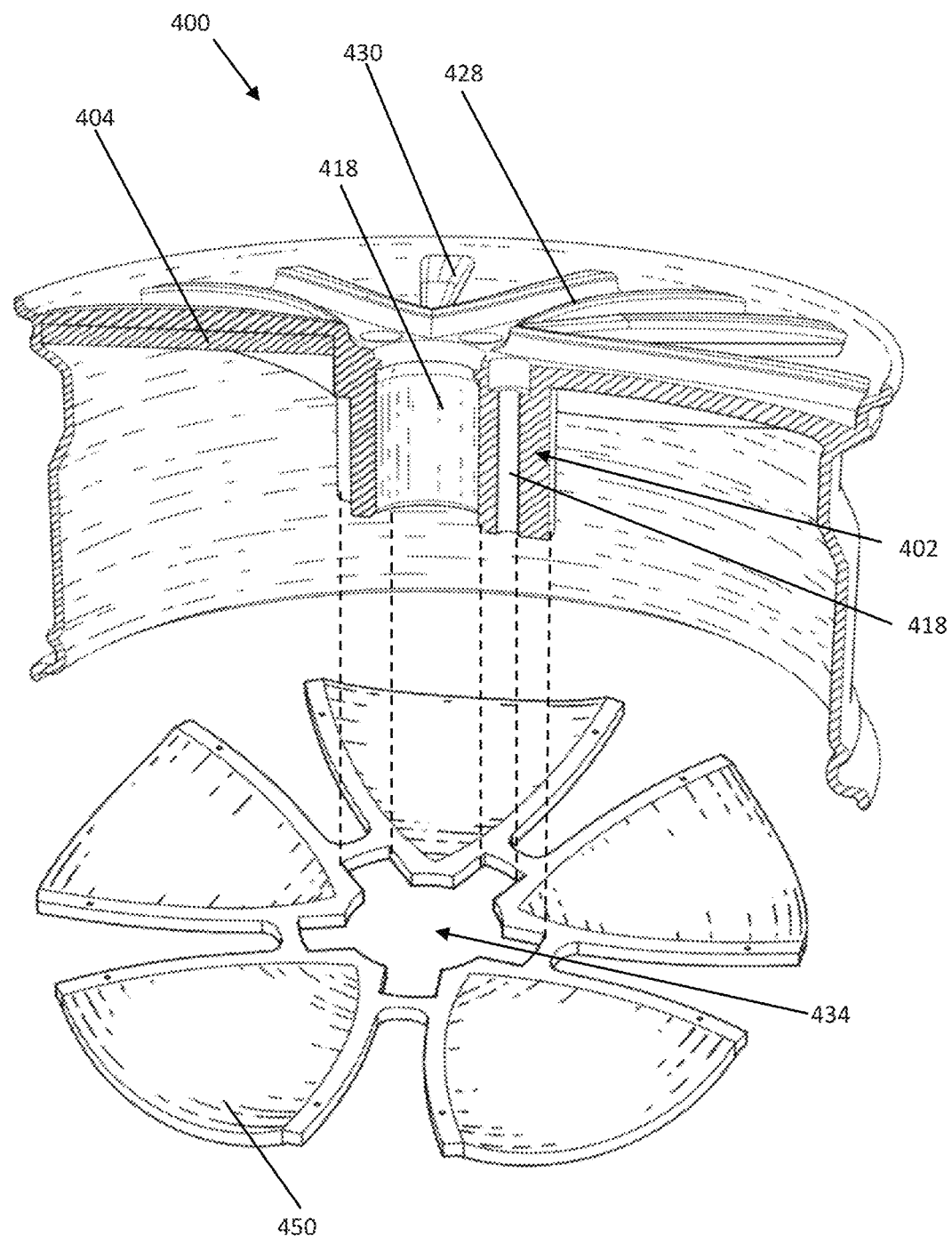

FIGS. 4G and 4H are pictorial diagrams showing an exploded perspective view and a partial cross-sectional perspective view of wheel 400, respectively, in accordance with one or more embodiments of the present disclosure. In one or more embodiments, each reflective surface 406 may be optically aligned with a corresponding colored surface 404. For example, colored substrates 404 may be mounted to the underside of each straight spoke 430. Each reflective surface 406 may be positioned centrally behind a straight spoke 430 so that each colored surface 452 is optically aligned with a corresponding reflective surface 406. Each reflective surface 406 may be visible through one or more apertures 426 of support structure 456. Gaps 424 of base 450 may be positioned behind flared spokes 428 so that gaps are not visible to outside environment 5. In one or more embodiments, gaps 424 of base 450 may be the same shape as flared spokes 428 so that gaps 424 are hidden from the outside environment 5.

In one or more embodiments, mount 402 may be a geometric shape that traverses through a complementary opening 434 of base 450. In one or more embodiments, mount 402 may be a polygonal shape that engages the complementary surfaces of opening 434 and prevents base 450 from rotating freely relative to rim 410. In one or more embodiments, reflective surfaces 406 may be fixed to mount 402 or rim 410. In other embodiments, reflective surfaces 406 may freely rotate about central axis D, separately from mount 402 or rim 410.

One skilled in the art will recognize that the structural shape and configuration of base 450 may vary widely and may incorporate planar, concave, or convex surfaces and the like. Reflective surfaces 406 are configured to selectively reflect one or more colors from colored surfaces 452. In one or more embodiments, each of reflective surfaces 406 may be angled relative to corresponding colored surface 452 to provide an optimally visible reflection to outside environment 5. In other embodiments, when using one or more colored surfaces 452, each reflective surface 406 may be configured to be independently angled to selectively reflect and display only a single color from a colored surface having two or more colored regions of different colors.

As understood by one skilled in the art, though spokes 428,430 are shown as flared and straight, respectively, each spoke may be any shape or dimension. Furthermore, any quantity of spokes may be used with wheel 400, as shown in exemplary embodiments discussed further herein.

Figure 5:
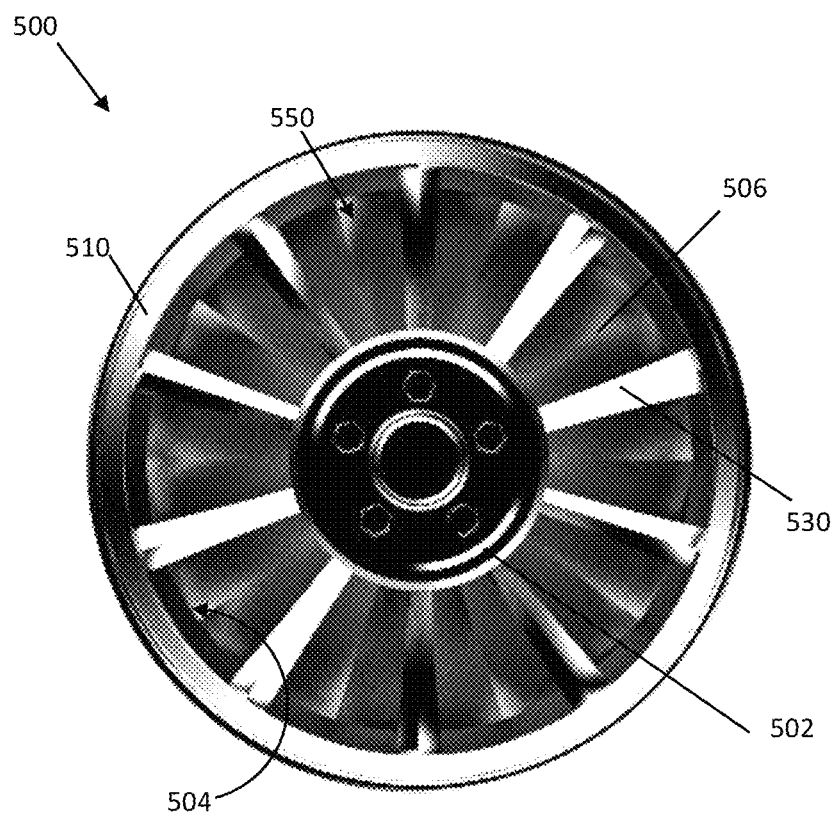
FIG. 5 is a pictorial diagram showing a front plan view of another exemplary embodiment of a wheel with structural support in accordance with one or more embodiments of the present disclosure.

FIG. 5 is a pictorial diagram showing a front plan view of an exemplary embodiment of the wheel, wheel 500, in accordance with one or more embodiments of the present disclosure. In one or more embodiments, wheel 100 may include a rim 510, a base 550 with a reflective surface 506, a mount 502, and a support structure 556 that includes spokes 530. In one or more embodiments, wheel 500 may have a colored substrate 504 that includes LEDs, which illuminate at least of portion of reflective surface 506 with at least one colored light. As shown in exemplary FIG. 5, reflective surface 506 may be corrugated and positioned behind straight spokes 530.

Figure 6:
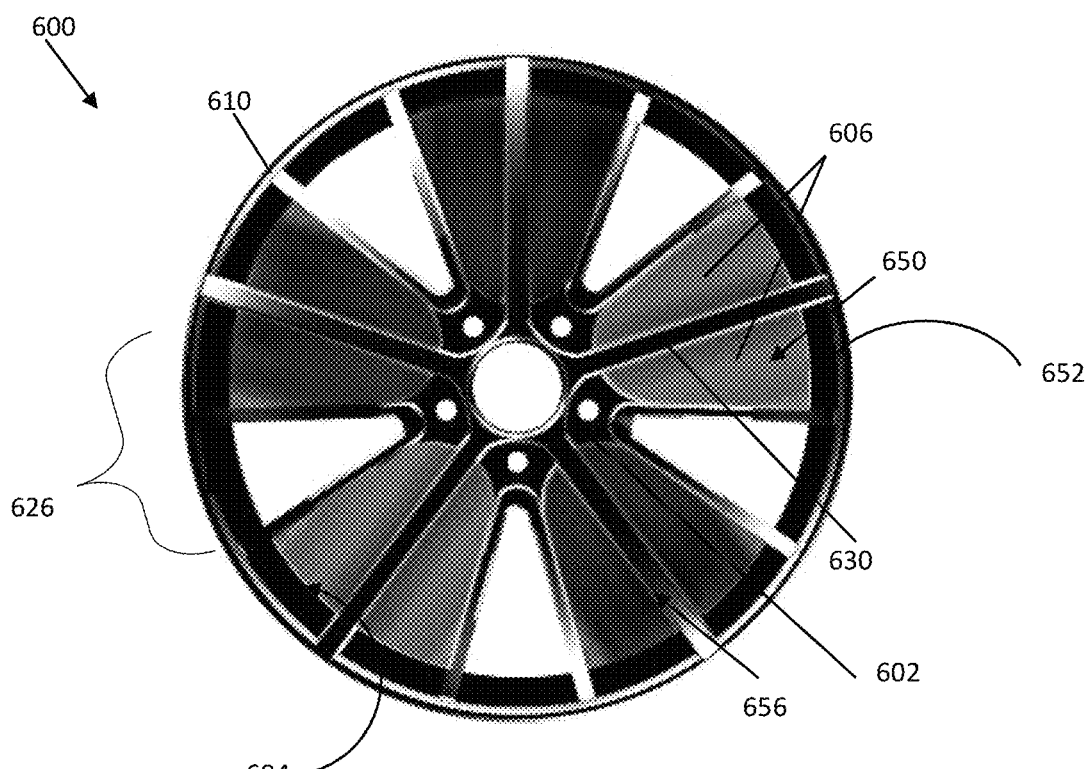
FIG. 6 is a pictorial diagram showing a front plan view of another exemplary embodiment of a wheel with structural support in accordance with one or more embodiments of the present disclosure.

FIG. 6 is a pictorial diagram showing a front plan view of an exemplary embodiment of the wheel, wheel 600, in accordance with one or more embodiments of the present disclosure. Wheel 600 includes a rim 610, a mount 602, a base 650 with a plurality of reflective surfaces 606, and a support structure 656 that includes straight spokes 630. In one or more embodiments, base 650 may include a plurality of reflective surface 606 that are positioned behind spokes 630. Colored surfaces 652 of colored substrates 604 may be mounted on the underside of spokes 630 or along an inner surface of rim 610. In one or more embodiments, spokes 630 may define apertures 626, and reflective surfaces 606 may be visible through apertures 626.

Figure 7A:
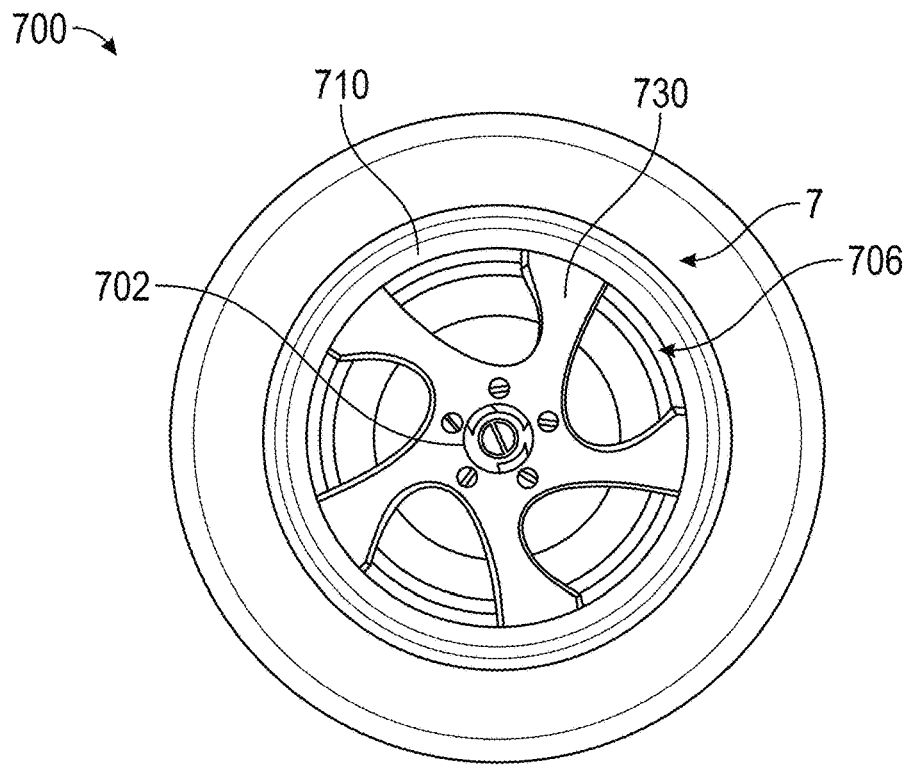
FIGS. 7A and 7B are pictorial diagrams showing front plan views of other exemplary embodiments of a wheel with structural support in accordance with one or more embodiments of the present disclosure.
Figure 7B:
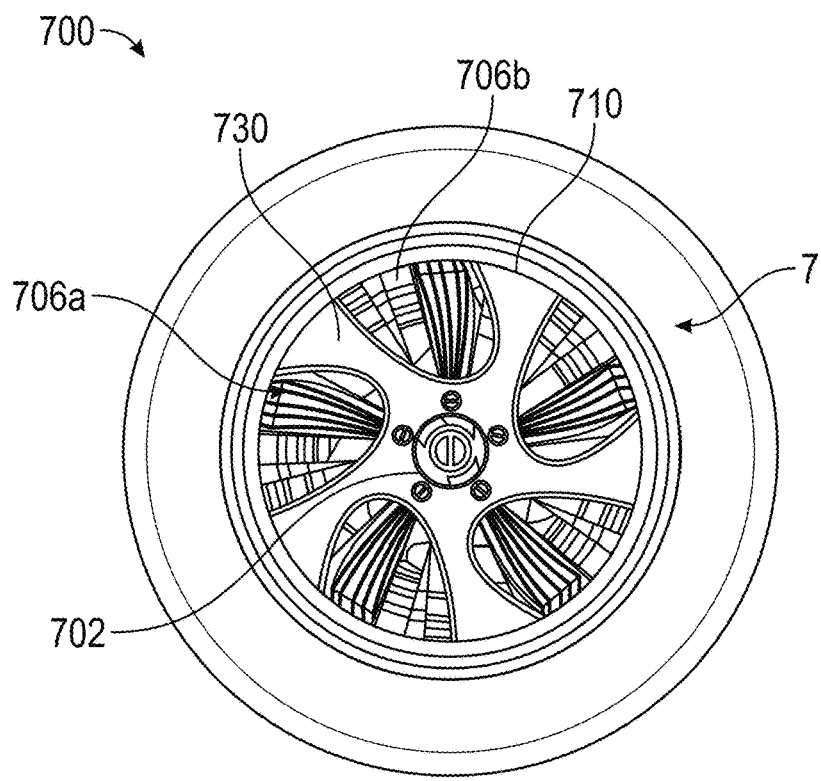

FIGS. 7A and 7B are pictorial diagrams showing front plan views of exemplary embodiments of the wheel, a wheel 700, in accordance with one or more embodiments. Wheel 700 may include rim 710, mount 702, base 750, and support structure 756. Wheel 700 is shown with a tire 7 mounted on rim 710. Spokes 730 may be slightly skewed and radially extend from mount 702. As shown in FIG. 7A, wheel 700 may have a base 750 that includes a polished reflective surface that is "O"-shaped (e.g. ring about an inner circumference of rim 710).

As shown in FIG. 7B, wheel 700 may instead have a base 750 that includes a first layer of reflective surfaces 706a and a second layer of reflective surfaces 706b. In one or more embodiments, only one of the layers of reflective surfaces 706a,b may be colored by a colored substrate (not shown). In other embodiments, both layers of reflective surfaces 706a,b may reflect colored surfaces to display one or more colors. For example, a first colored substrate may be secured to the rear of spokes 730 to color first layer of reflective surface 706a, and a second colored substrate may be secured to the rear of the first layer of reflective surface 706a to color second layer of reflective surface 706b. In another example, the colored layers may be placed at various depths along rim 710 (e.g., between the inner lip and outer lip) to color each layer of reflective surfaces 706a,b.

Figure 8A:
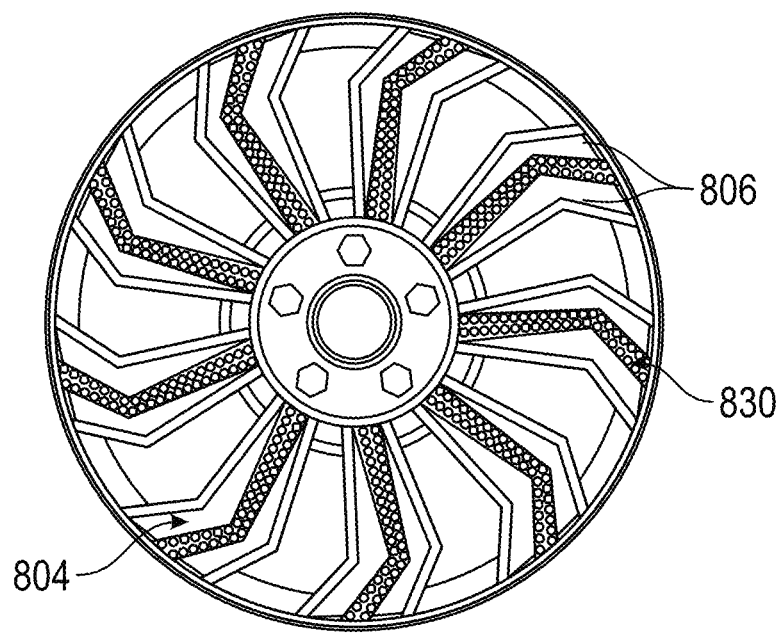
FIGS. 8A and 8B are pictorial diagrams showing a front plan view of other exemplary embodiments of the wheel with structural support in accordance with one or more embodiments of the present disclosure.
Figure 8B:
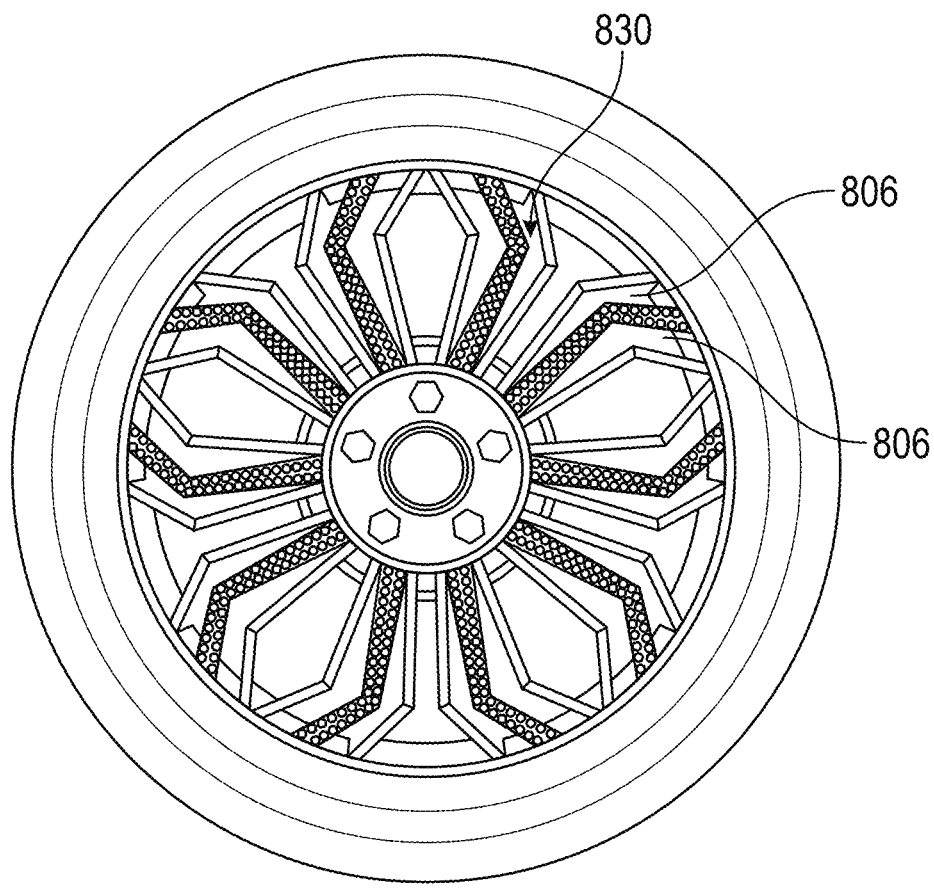

FIGS. 8A and 8B are pictorial diagrams of other exemplary embodiments of the wheel, a wheel 800, in accordance with one or more embodiments of the present disclosure. In one or more embodiments, spokes 830 may include reflective surfaces 806 and colored substrates 804, which reflect off reflective surfaces 806 of spokes 830 to display a reflected color. In one or more embodiments, a base with additional reflective surfaces may be positioned behind spokes 830 (not shown).

Figure 9:
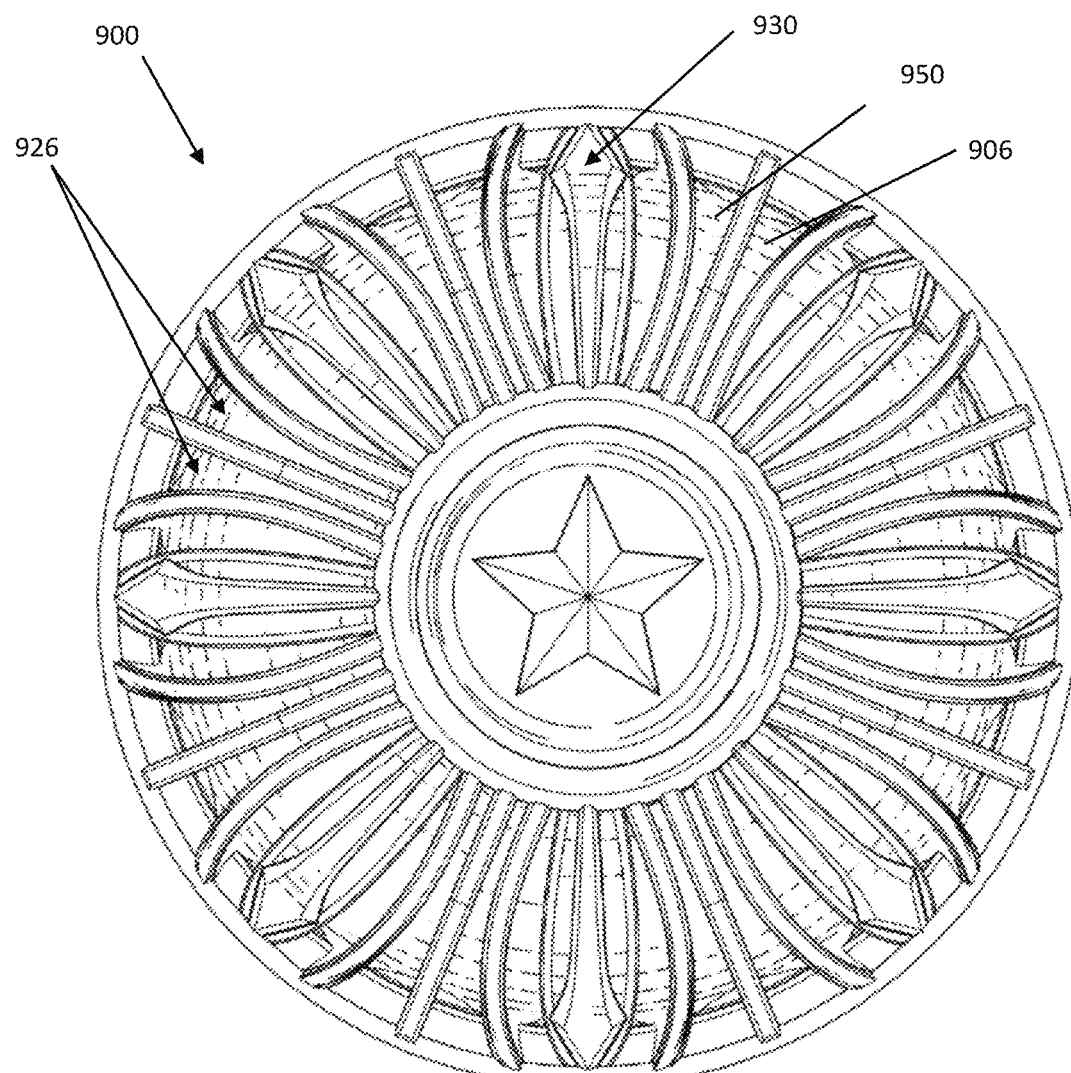
FIG. 9 is a pictorial diagram showing a front plan view of another exemplary embodiment of a wheel with structural support in accordance with one or more embodiments of the present disclosure.

FIG. 9 is a pictorial diagram of an exemplary embodiment of the wheel, wheel 900, in accordance with one or more embodiments of the present disclosure. Wheel 900 may include spokes 930. In one or more embodiments, apertures 926 are disposed between spokes 930, and reflective surfaces 906 of base 950 are visible through apertures 926. In one or more embodiments, a second set of spokes may be positioned under a first set of spokes (not shown).

Figure 10:
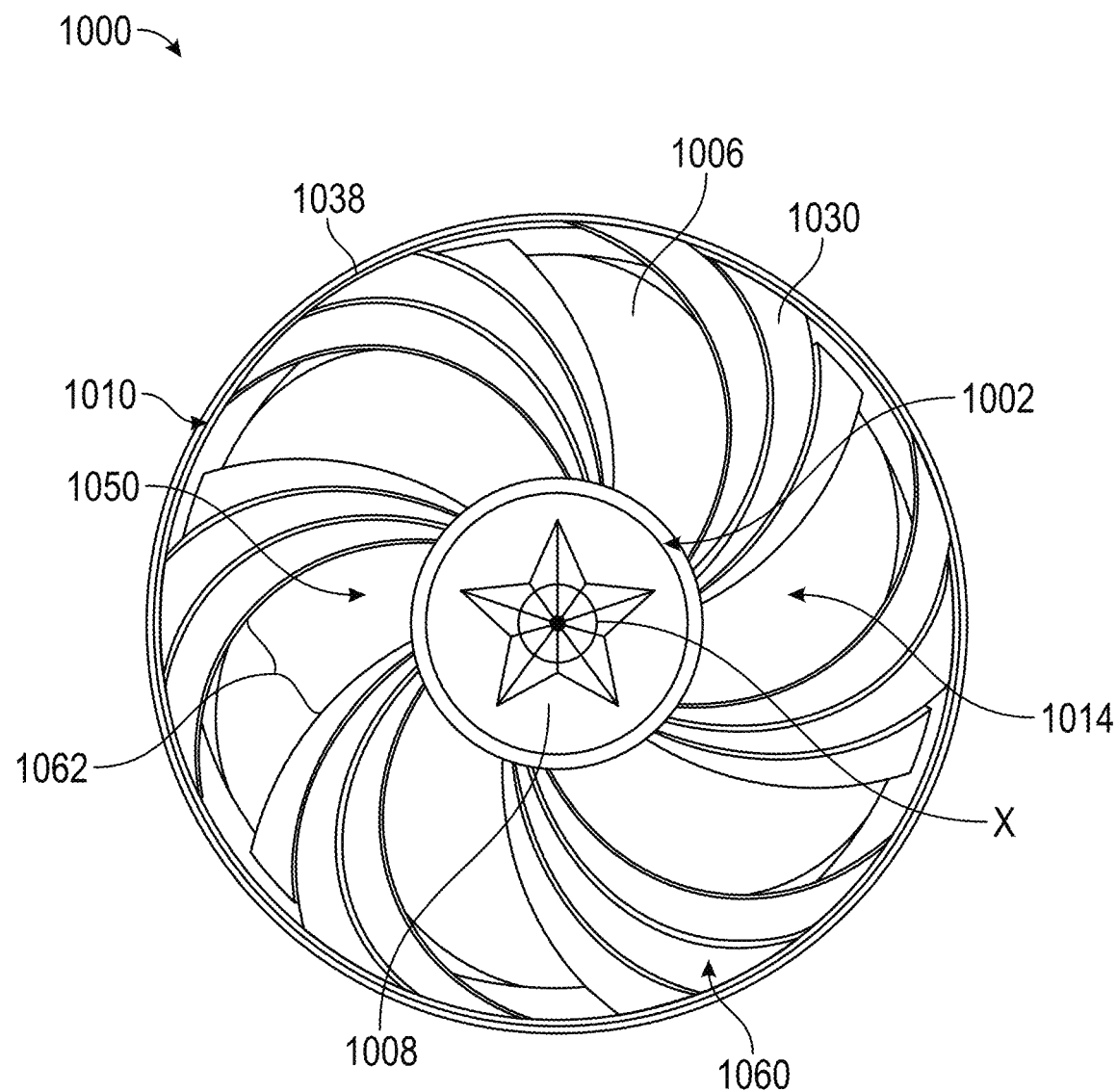
FIG. 10 is a pictorial diagram showing a front plan view of another exemplary embodiment of a wheel with a lid secured thereto in accordance with one or more embodiments of the present disclosure.

FIG. 10 is a pictorial diagram showing a front plan view of another exemplary embodiment of the wheel, wheel 1000, in accordance with one or more embodiments of the present disclosure. Wheel 1000 may include a rim 1010, a base 1050 with one or more reflective surfaces 1006, one or more colored substrates with one or more colored surfaces (not shown), and a mount 802. In one or more embodiments, wheel 1000 may also include an ornamental lid 1060 (e.g., wheel cover). Lid 1060 may include one or more apertures 1062 and may be configured to removably couple to mount 1002. For example, hubcap 1008 may secure lid 1060 to mount 1002. In one or more embodiments, lid 1060 at least partially encloses cavity 1014. Reflective surfaces 1006 are visible to the external environment through the one or more apertures 1062 of lid 1060. In one or more embodiments, lid 1060 is configured to rotate freely about central axis X and relative to rim 1010. In other embodiments, lid 1060 is fixed relative to rim 1010.

In one or more embodiments, lid 1060 may have one or more spokes 1030 that define apertures 1062. For example, lid 1060 may include ribbed spiral spokes 1030 with apertures 1062 disposed on either side of each spoke 1030. Lid 1060 may be a removable component secured to wheel 1000 using hubcap 1008 of mount 1002 or by securing lid 1060 to rim 1010 (e.g., outer lip 1038).

In one or more embodiments, lid 1060 may be configured to interchangeably accept a plurality of different colored substrates, thereby providing a plurality of different colors for reflection. In one or more embodiments, lid 1060 is configured to be removably attached to wheel 1000.

FIGS. 11A-11G are pictorial diagrams showing several front plan views of exemplary embodiments of lids 1060 of wheel 1000 in accordance with one or more embodiments of the present disclosure. Lid 1060 may include one or more apertures 1062 (e.g., cutaways) through which reflective surface 1006 may be viewed by an observer in the outside environment. As understood by one skilled in the art, lid 1060 and apertures 1062 may be any shape, size, or design, as shown in FIGS. 11A-11G.

Figure 11F:
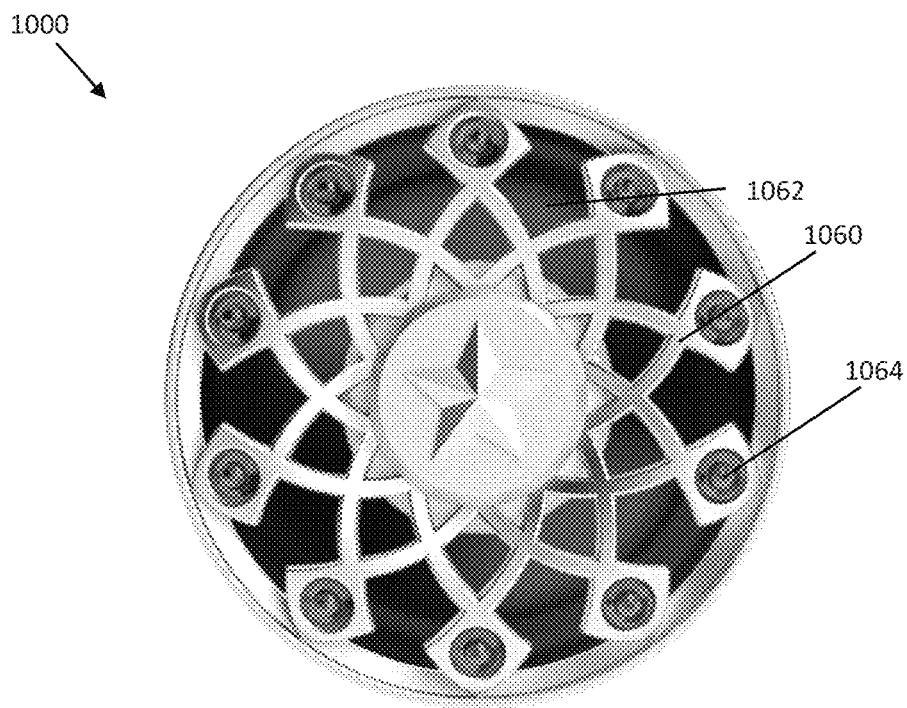
Figure 11G:
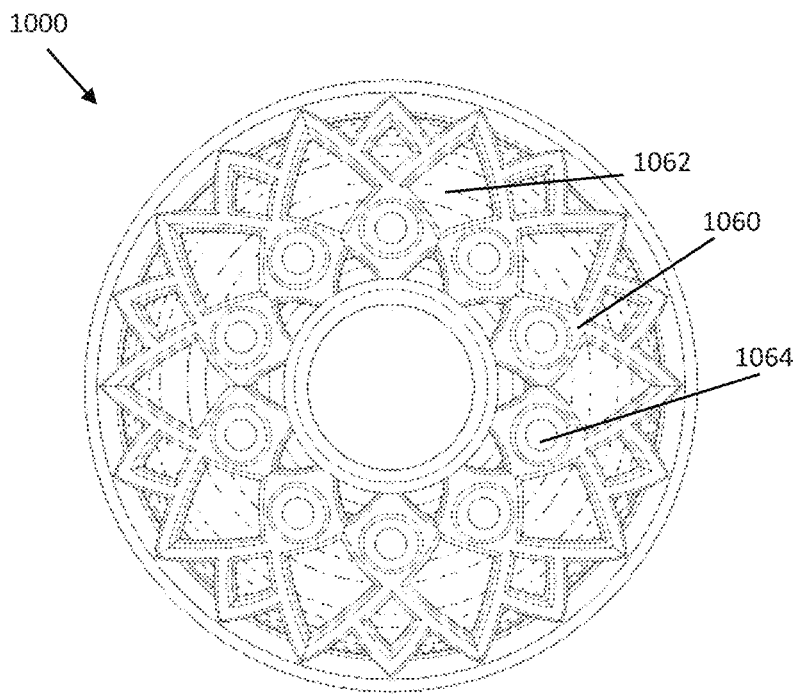

As shown in FIGS. 11F and 11G, lid 1060 may also include reflective surfaces, such as recessed reflective surfaces 1064, disposed on the outer surface of lid 1060 so that the reflective surfaces 1064 are visible to an outside environment. Colored substrates (not shown) may be disposed within or near reflective surfaces 1064 so that reflective surfaces 1064 may display the reflection of the colored surfaces of the colored substrates.

Figure 12:
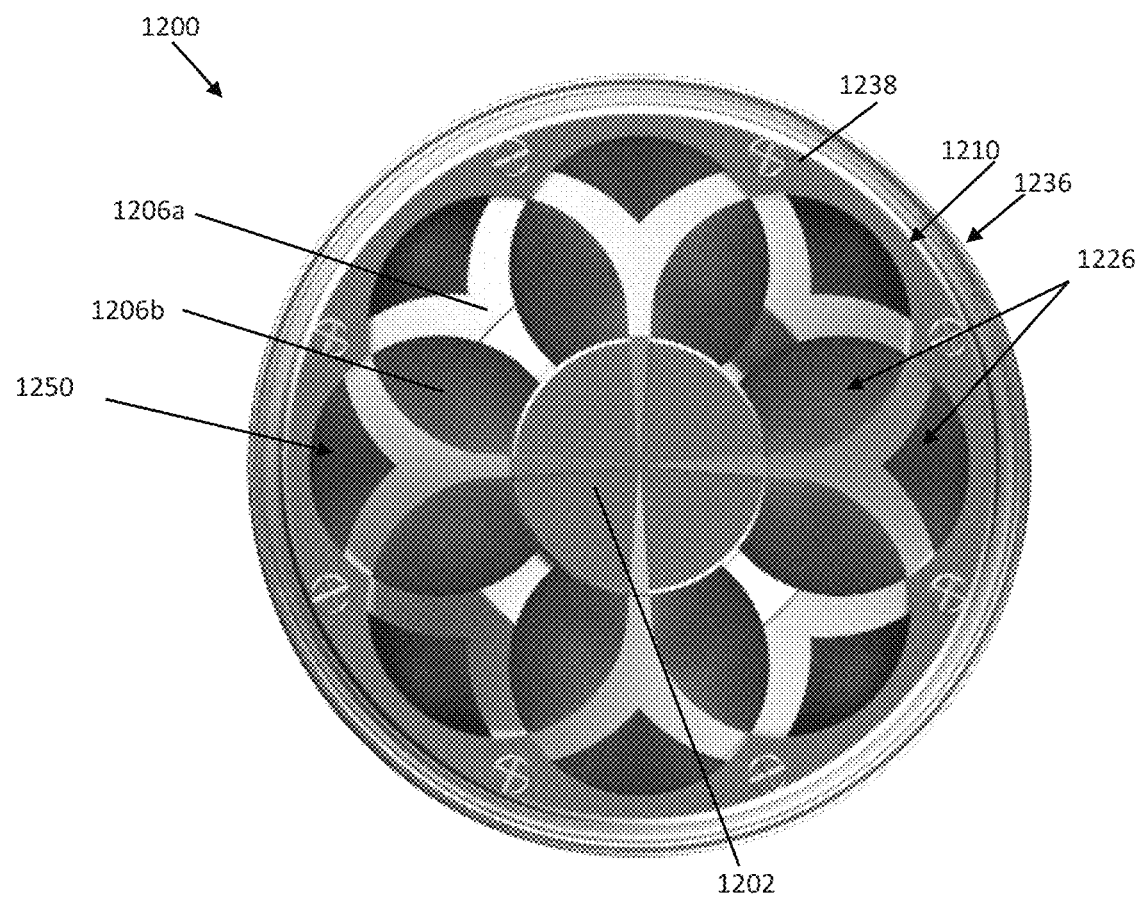
FIG. 12 is a pictorial diagram showing a front plan view of another exemplary embodiment of a wheel in accordance with one or more embodiments of the present disclosure.

FIG. 12 is a pictorial diagram showing a front plan view of an exemplary view of the wheel, a wheel 1200, in accordance with one or more embodiments of the present disclosure. Outer lip 1238 of rim 2010 may extend inward toward mount 1202. In one or more embodiments, outer lip 1238 may be various ornamental designs (e.g., scalloped, bezeled, or other edging techniques).

In one or more embodiments, base 1250 may include layers of reflective surfaces. For example, base 1250 may include a first layer of reflective surfaces 1206a and a second layer of reflective surfaces 1206b. First layer of reflective surfaces 1206a may be behind outer lip 1238 and in front of second layer of reflective surfaces 1206b. Second layer of reflective surfaces 1206b may be between first layer of reflective surfaces 1206a and inner lip 1236 of rim 1210.

In one or more embodiments, layers of reflective surfaces 1206a,b may be any shape or size. In one or more embodiments, layers of reflective surfaces 1206a,b may include cutaways (e.g., apertures 1226). For example, first layer of reflective surfaces 1206a may provide apertures 1226 so that second layer of reflective surfaces 1206b is visible to outside environment 5 through apertures 1226. First layer of reflective surfaces 1206a may display a different reflected color than second layer of reflective surfaces 1206b. As understood by one skilled in the art, the quantity of layers of reflective surfaces is not limited to two layers.

The disclosure is not intended to limit the present invention to the precise forms or particular fields of use disclosed. It is contemplated that various alternate embodiments and/or modifications to the present invention, whether explicitly described or implied herein, are possible in light of the disclosure. For example, it is contemplated that the various embodiments set forth herein may be combined together and/or separated into additional embodiments where appropriate. Where applicable, the ordering of various steps described herein can be changed, combined into composite steps, and/or separated into sub-steps to provide features described herein.

Although the invention has been described with reference to the above example, it will be understood that modifications and variations are encompassed within the spirit and scope of the invention. Accordingly, the invention is limited only by the following claims.

What is claimed is:

1. A wheel for a vehicle, the wheel comprising:
   a) a mount configured to mount the wheel to a hub of the vehicle;
   b) a colored substrate positioned at a middle of the wheel that is hidden from direct view from an outside environment when the wheel is mounted to the hub; and
   c) a contoured reflective surface that encircles the colored substrate, wherein the surface is contoured to reflect coloring of the colored substrate around an entirety of the colored substrate, thereby appearing to alter coloring of the reflective surface.

2. The wheel of claim 1, wherein the colored substrate configured for removable attachment to the wheel.

3. The wheel of claim 1, wherein the colored substrate is a sleeve that surrounds the mount.

4. The wheel of claim 3, wherein the reflective surface comprises a generally paraboloidal reflective surface that is symmetric about a central axis.

5. The wheel of claim 1, further comprising a lid configured to cover the mount.

6. The wheel of claim 5, wherein the lid comprises an aperture or cutaway through which the reflective surface is viewed.

7. The wheel of claim 5, wherein the lid rotates freely about a central axis.

8. The wheel of claim 1, wherein the reflective surface comprises a plurality of surface features, each independently selected from the group consisting of engraved, undulated, corrugated, hammered, grated, divoted, dimpled, checkered, and stepped.

9. The wheel of claim 1, wherein the wheel is a monolithic structure.

10. The wheel of claim 1, wherein the colored surface comprises a plurality of different colors arranged to provide different colored regions over an entirety over the reflective surface.

11. A method of changing wheel colors on an automobile, the method comprising:
    a) providing the wheel of claim 1 mounted to the hub of the automobile, the wheel configured to interchangeably accept a plurality of different colored substrates colored differently; and
    b) interchanging one colored substrate for another within the wheel.

* * * * *